US011757594B2

(12) United States Patent
Frenne et al.

(10) Patent No.: US 11,757,594 B2
(45) Date of Patent: Sep. 12, 2023

(54) DETERMINING PHASE TRACKING REFERENCE SIGNALS IN MULTIPLE TRANSMISSION POINTS

(71) Applicant: Telefonaktiebolaget LM Ericsson (publ), Stockholm (SE)

(72) Inventors: Mattias Frenne, Uppsala (SE); Shiwei Gao, Nepean (CA); Siva Muruganathan, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 93 days.

(21) Appl. No.: 17/405,263

(22) Filed: Aug. 18, 2021

(65) Prior Publication Data
US 2021/0385045 A1    Dec. 9, 2021

Related U.S. Application Data

(63) Continuation of application No. 17/106,684, filed on Nov. 30, 2020, now Pat. No. 11,128,428, which is a
(Continued)

(51) Int. Cl.
*H04L 5/00* (2006.01)
*H04B 7/08* (2006.01)
*H04W 72/23* (2023.01)

(52) U.S. Cl.
CPC .............. *H04L 5/0053* (2013.01); *H04B 7/08* (2013.01); *H04L 5/0023* (2013.01);
(Continued)

(58) Field of Classification Search
CPC ..... H04W 72/23; H04W 72/04; H04W 72/21; H04W 76/27; H04L 5/0023; H04L 5/0048; H04L 5/0053; H04B 7/08
See application file for complete search history.

(56) References Cited

U.S. PATENT DOCUMENTS

2019/0081752 A1  3/2019 Hunukumbure
2019/0165910 A1  5/2019 Lee et al.
(Continued)

FOREIGN PATENT DOCUMENTS

EP            1030670 A1   7/2022
WO    WO 2019/160379 A1   8/2019

OTHER PUBLICATIONS

3GPP TS 38.214 v15.6.0—3rd Generation Partnership Project; Technical Specification Group Radio Access Network; NR; Physical layer procedures for data (Release 15) (Jun. 2019), 105 pages.
(Continued)

*Primary Examiner* — Chi Ho A Lee
(74) *Attorney, Agent, or Firm* — Sage Patent Group

(57) ABSTRACT

A method for a UE in a multiple transmission points communication system, mTRP, scheme, is provided. The method includes receiving downlink control information, DCI, indicating a at least two transmission points scheme for a scheduled data transmission on physical resource blocks, PRBs. The PRBs includes at least a first subsets of PRBs, associated with a first transmission point, and a second subset of PRBs, associated with a second transmission point. The method further includes determining a first PT-RS frequency density for the first set of PRBs based on the number of PRBs in the first set of PRBs and a second PT-RS frequency density based on the number of PRBs in the second set of PRBs. A UE, methods for a base station and a base station are also provided.

28 Claims, 22 Drawing Sheets

Related U.S. Application Data continuation of application No. PCT/SE2020/050988, filed on Oct. 16, 2020.

(60) Provisional application No. 62/932,779, filed on Nov. 8, 2019.

(52) U.S. Cl.
CPC .......... *H04L 5/0048* (2013.01); *H04L 5/0094* (2013.01); *H04W 72/23* (2023.01)

(56) References Cited

U.S. PATENT DOCUMENTS

| | | | |
|---|---|---|---|
| 2019/0166615 A1 | 5/2019 | Nimbalker | |
| 2019/0296876 A1 | 9/2019 | Zhang | |
| 2019/0297603 A1 | 9/2019 | Guo | |
| 2020/0022067 A1 | 1/2020 | Pan et al. | |
| 2020/0045700 A1* | 2/2020 | Sun | H04W 76/27 |
| 2020/0052740 A1 | 2/2020 | Zhang | |
| 2020/0052747 A1 | 2/2020 | Onggosanusi | |
| 2020/0052950 A1 | 2/2020 | Manolakos | |
| 2020/0154410 A1 | 5/2020 | Suzuki | |
| 2020/0213050 A1 | 7/2020 | Chen | |
| 2020/0220675 A1 | 7/2020 | Lee et al. | |
| 2020/0221487 A1 | 7/2020 | Lee | |
| 2020/0228225 A1 | 7/2020 | Bhamri et al. | |
| 2020/0404667 A1 | 12/2020 | Khoshnevisan | |
| 2021/0014021 A1* | 1/2021 | Hunukumbure | H04W 72/04 |
| 2021/0014883 A1 | 1/2021 | Khoshnevisan | |
| 2021/0105166 A1* | 4/2021 | Khoshnevisan | H04W 72/23 |
| 2021/0136802 A1* | 5/2021 | Cirik | H04W 72/23 |
| 2021/0144744 A1* | 5/2021 | Zhou | H04W 72/23 |
| 2021/0168779 A1* | 6/2021 | Mondal | H04W 72/23 |
| 2022/0070899 A1* | 3/2022 | Huang | H04W 72/23 |
| 2022/0117024 A1* | 4/2022 | Saber | H04W 72/21 |
| 2022/0239358 A1* | 7/2022 | Kim | H04W 72/04 |
| 2022/0239433 A1 | 7/2022 | Kim et al. | |
| 2022/0272760 A1 | 8/2022 | Murray et al. | |
| 2022/0311577 A1 | 9/2022 | Matsumura et al. | |
| 2022/0322399 A1* | 10/2022 | Kim | H04W 72/23 |
| 2022/0360408 A1 | 11/2022 | Jung et al. | |

OTHER PUBLICATIONS

Vivo, "Further discussion on multi TRP transmission", 3GPP TSG RAN1 #96, Athens, Greece, Feb. 25-Mar. 1, 2019, R1-1901702, 14 pages.

Qualcomm Incorporated, "Multi-TRP Enhancements", 3GPP TSG-RAN WG1 Meeting #96, Feb. 25-Mar. 1, 2019, Athens, Greece, R1-1903043, 31 pages.

Ericsson, "NC-JT performance with layer restriction between TRPs", 3GPP TSG RAN WG1 Meeting #96bis, Xian, China, Apr. 8-12, 2019, R1-190566, 6 pages.

Ericsson, "On MAC-CE signaling impact of Rel-16 TCI indication framework", 3GPP TSG RAN WG1 Meeting #97, Reno, USA, May 13-17, 2019, R1-1907423, 4 pages.

Ericsson, "Performance evaluation of NC-JT with different clustering approaches", 3GPP TSG RAN WG1 Meeting #97, Reno, USA, May 13-17, 2019, R1-1907422, 6 pages.

Ericsson, R1-1905165, "Performance comparison of different RV combinations for SDM and FDM based schemes", 3GPP TSG RAN WG1 Meeting #96bis, Xian, China, Apr. 8-12, 2019, R1-1905165, 3 pages.

Ericsson, R1-1907425, "Additional evaluation results on multi-TRP schemes for reliable PDSCH transmission in URLLC", 3GPP TSG RAN WG1 Meeting #97, Reno, USA, May 13-17, 2019, 5 pages.

Ericsson, R1-1907421, "On the number of TRPs for high reliability at 4 GHz", 3GPP TSG RAN WG1 #97, Reno, USA, May 13-17, 2019, 4 pages.

Ericsson, R1-1907420, "Additional evaluation results on NC-JT performance with layer restriction between TRPs", 3GPP TSG RAN WG1 Meeting #97, Reno, USA, May 13-17, 2019, 3 pages.

Ericsson, R1-1907515, "On schemes 3 and 4 for URLLC with Multi-TRP", 3GPP TSG RAN WG1 Meeting #97, Reno, USA, May 13-17, 2019, 3 pages.

Ericsson, R1-1907426, "On Multi-TRP based URLLC Schemes for Downlink SPS", 3GPP TSG RAN WG1 Meeting #97, Reno, USA, May 13-17, 2019, 2 pages.

Ericsson, RP-191599, "Enhancements for dynamic spectrum sharing in Rel-16", 3GPP TSG-RAN Meeting #84, Newport Beach, CA, USA, Jun. 3-6, 2019, 2 pages.

Ericsson, R1-1909465, "On multi-TRP and multi-panel", 3GPP TSG RAN WG1 Meeting RAN1#98, Prague, Czech Republic, Aug. 26-30, 2019, 32 pages.

Ericsson, R1-1909423, "Preliminary results on PDCCH over multi-TRP for URLLC", 3GPP TSG RAN WG1 Meeting RAN1#98, Prague, Czech Republic, Aug. 26-30, 2019, 4 pages.

Ericsson, R2-1910143, "Protocol structure for Multi-TRP operation", 3GPP TSG-RAN WG2 #107, Prague, Czech Republic, Aug. 26-30, 2019, 10 pages.

Huawei, Hisilicon, R1-1908066, "Enhancements on Multi-TRP/panel transmission", 3GPP TSG RAN WG1 Meeting #98, Prague, Czech Republic, Aug. 26-30, 2019, 23 pages.

International Search Report and Written Opinion for International Application No. PCT/SE2020/050988 dated Jan. 21, 2021, 15 pages.

NEC, "Discussion on multi-TRP transmission", 3GPP TSG RAN WG1 #98bis, Chongqing, China, Oct. 14-20, 2019, R1-1910573, XP051808239, 3 pages.

Fujitsu, "Discussion on remaining details on PT-RS", 3GPP TSG RAN WG1 Meeeting #92bis, Sanya, China, Apr. 16-20, 2018, R1-1803940, XP51426231, 4 pages.

Ericsson, "Finalizing issues for mTRP", 3GPP TSG-RAN WG1 Meeting #99, Reno, USA, Nov. 18-22, 2019, Tdoc R1-1912656, XP51820150, 17 pages.

European Patent Office, Office Action, EP Application No. 20797227.4, dated Mar. 10, 2023, 8 pages.

* cited by examiner

Figure 10

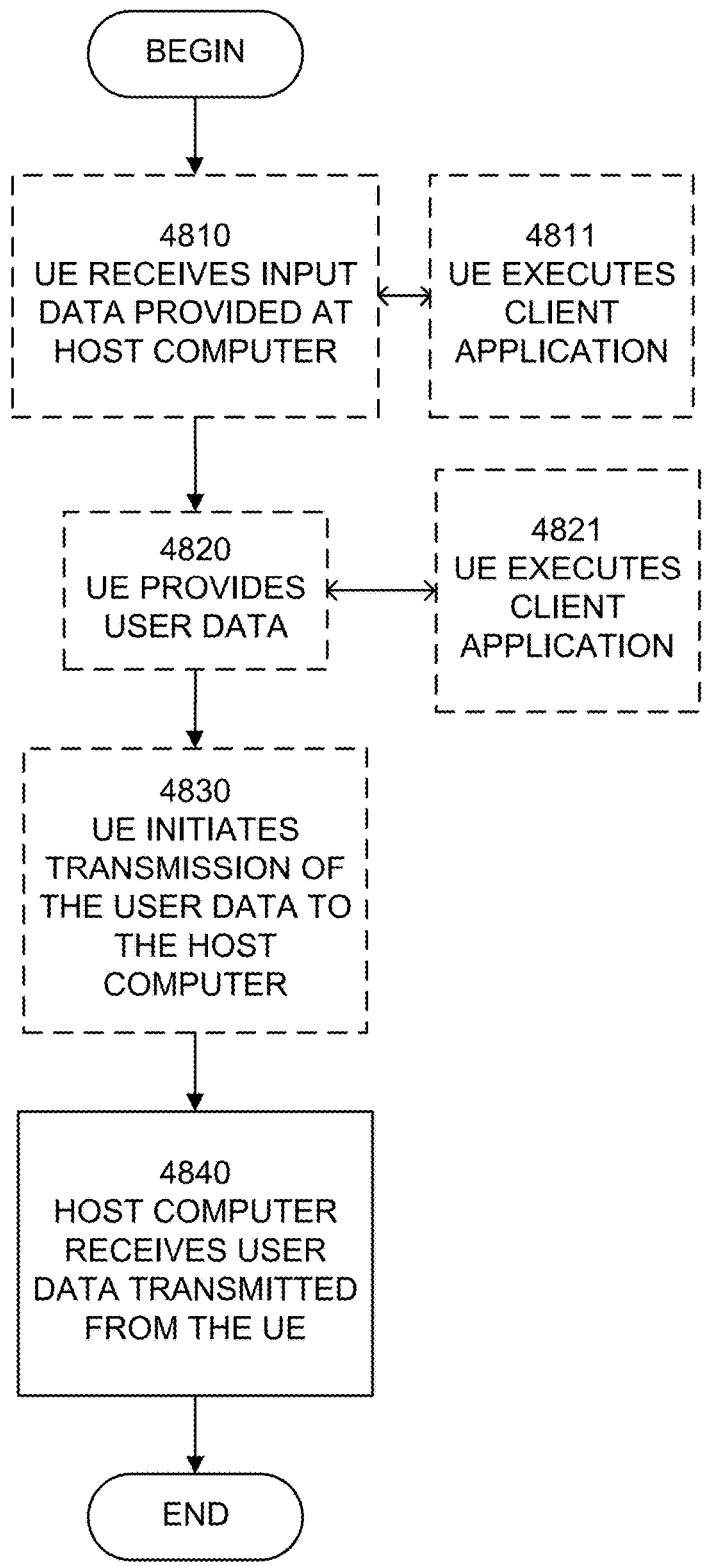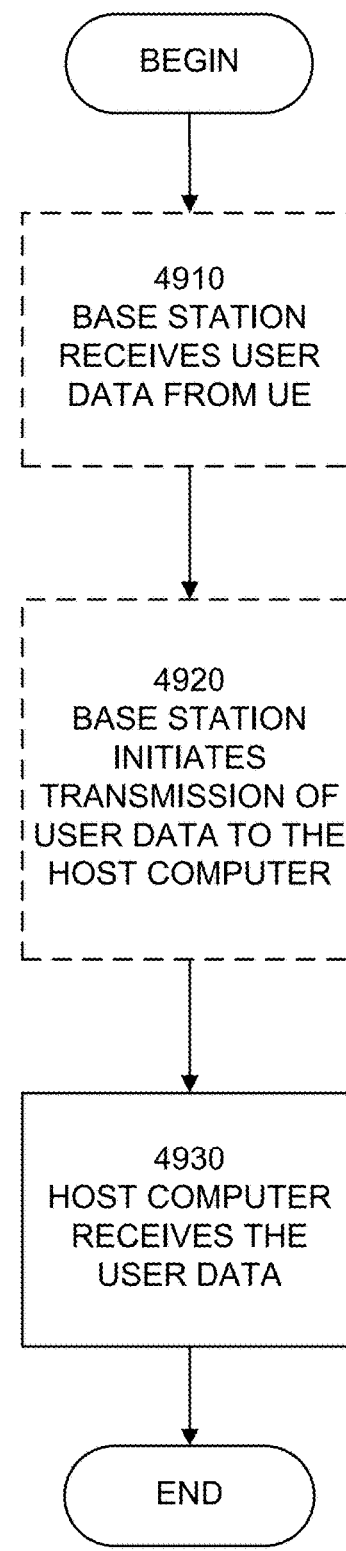
Figure 28
Figure 29

DETERMINING PHASE TRACKING REFERENCE SIGNALS IN MULTIPLE TRANSMISSION POINTS

CROSS REFERENCE TO RELATED APPLICATIONS

This application is a continuation of U.S. application Ser. No. 17/106,684 filed on Nov. 30, 2020, which is a continuation of PCT International Application No. PCT/SE2020/050988 filed on Oct. 16, 2020, which claims priority to U.S. Provisional Patent Application No. 62/932,779 filed on Nov. 8, 2019, the disclosures and content of which are incorporated by reference herein in their entirety.

TECHNICAL FIELD

The present disclosure relates generally to communications, and more particularly to communication methods and related devices and nodes supporting wireless communications.

BACKGROUND

The new generation mobile wireless communication system (5G) or new radio (NR) supports a diverse set of use cases and a diverse set of deployment scenarios. NR uses CP-OFDM (Cyclic Prefix Orthogonal Frequency Division Multiplexing) in the downlink (i.e. from a network node, gNB, eNB, or base station, to a communication device (e.g., user equipment or UE) and both CP-OFDM and DFT-spread OFDM (DFT-S-OFDM) in the uplink (i.e. from communication device to gNB). In the time domain, NR downlink and uplink physical resources are organized into equally-sized subframes of 1 ms each. A subframe is further divided into multiple slots of equal duration.

The slot length depends on subcarrier spacing. For subcarrier spacing of $\Delta f=15$ kHz, there is only one slot per subframe, and each slot consists of 14 OFDM symbols, irrespectively of the subcarrier spacing.

Typical data scheduling in NR are per slot basis, an example is shown in FIG. 1 where the first two symbols contain physical downlink control channel (PDCCH) and the remaining 12 symbols contains physical data channel (PDCH), either a PDSCH (physical downlink data channel) or PUSCH (physical uplink data channel).

Different subcarrier spacing values are supported in NR. The supported subcarrier spacing (SCS) values (also referred to as different numerologies) are given by $\Delta f=(15 \times 2^\alpha)$ kHz where $\alpha \in (0, 1, 2, 4, 8)$. $\Delta f=15$ kHz is the basic subcarrier spacing that is also used in LTE, the corresponding slot duration is 1 ms. For a given SCS, the corresponding slot duration is $1/(2^\alpha)$ ms.

In the frequency domain physical resource definition, a system bandwidth is divided into resource blocks (RBs), each corresponding to 12 contiguous subcarriers. The basic NR physical time-frequency resource grid is illustrated in FIG. 2, where only one resource block (RB) within a 14-symbol slot is shown. One OFDM subcarrier during one OFDM symbol interval forms one resource element (RE).

Downlink transmissions can be dynamically scheduled, i.e., in each slot the gNB transmits downlink control information (DCI) over PDCCH about which communication device data is to be transmitted to and which RBs and OFDM symbols in the scheduled downlink slot the data is transmitted on. PDCCH is typically transmitted in the first one or two OFDM symbols in each slot in NR. The communication device data are carried on PDSCH. A communication device first detects and decodes PDCCH and if the decoding is successfully, it then decodes the corresponding PDSCH based on the decoded control information in the PDCCH.

Time Domain Resource Allocation

When the communication device is scheduled to receive PDSCH by a DCI, the Time domain resource assignment (TDRA) field value m of the DCI provides a row index m+1 to an allocation table. The determination of the used resource allocation table is defined in sub-clause 5.1.2.1.1 of 3GPP TS 38.214 v15.6.0. When a DCI is detected in a communication device specific search space for PDCCH, the PDSCH time domain resource allocation is according to a radio resource control (RRC) configured TDRA list by an RRC parameter pdsch-TimeDomainAllocationList provided in a communication device specific PDSCH configuration, pdsch-Config. Each TDRA entry in the TDRA list defines a slot offset $K_0$ between the PDSCH and the PDCCH scheduling the PDSCH, a start and length indicator SLIV, and the PDSCH mapping type (either Type A or Type B) to be assumed in the PDSCH reception.

Demodulation Reference Signals (DM-RSs) and Transmission Configuration Indicator (TCI) State Demodulation reference signals (DM-RS) are used for coherent demodulation of physical layer data channels, PDSCH (DL) and PUSCH (UL), as well as of physical layer downlink control channel PDCCH. The DM-RS is confined to resource blocks carrying the associated physical layer data channel and is mapped on allocated resource elements (REs) of the OFDM time-frequency grid in NR such that the receiver can efficiently handle time/frequency-selective fading radio channels. A PDSCH or PUSCH can have one or multiple DMRS, each associated with an antenna port. Thus, a DMRS is also referred to a DMRS port.

Several signals can be transmitted from different antenna ports of the same base station. These signals can have the same large-scale properties, for instance in terms of Doppler shift/spread, average delay spread, or average delay, when measured at the receiver. These antenna ports are then said to be quasi co-located (QCL). The network can then signal to the communication device that two antenna ports are QCL. If the communication device knows that two antenna ports are QCL with respect to a certain parameter (e.g. Doppler spread), the communication device can estimate that parameter based on a reference signal transmitted to one of the antenna ports and use that estimate when receiving another reference signal or physical channel the other antenna port. Typically, the first antenna port is represented by a measurement reference signal such as a channel-state information reference signal (CSI-RS) (known as source RS) and the second antenna port is a demodulation reference signal (DMRS) (known as target RS) for PDSCH or PDCCH reception.

In NR, a QCL relationship between a DMRS port in PDSCH and other reference signals is described by a TCI state. A communication device can be configured through RRC signalling with M TCI states, where M is up to 128 in frequency range 2 (FR2) for the purpose of PDSCH reception and up to 8 in FR1, depending on communication device capability. Each TCI state contains QCL information.

A communication device can be dynamically signaled one or two TCI states in the TCI field in a DCI scheduling a PDSCH.

Phase Tracking Reference Signal (PT-RS)

In NR, phase tracking reference signals (PT-RS) have been introduced for downlink and uplink and multiple different RS densities in time and frequency are supported.

The PT-RS resource elements are mapped to a single subcarrier in every $K_{PT-RS}$:th scheduled resource block where $K_{PT-RS}=2, 4$. So the inverse frequency density is every $K_{PT-RS}$:th scheduled resource block. Note that a resource block has 12 subcarriers.

Table 1 shows an example of a table that determines the inverse frequency density to use for PT-RS, depending on the scheduled bandwidth. Hence, if the communication device is scheduled a PDSCH bandwidth $N_{PRB}$ between ptrsthRB1 $\leq N_{PRB} <$ ptrsthRB2 then PT-RS is present in every 2nd RB, i.e. $K_{PT-RS}=2$.

TABLE 1

Rel. 15 NR inverse frequency density of PT-RS as a function of scheduled PDSCH bandwidth

| Scheduled bandwidth | Inverse frequency density ($K_{PT,RS}$) |
| --- | --- |
| $N_{PRB}$ < ptrsthRB0 | PT-RS is not present |
| ptrsthRB0 <= $N_{PRB}$ < ptrsthRB1 | present on every 2nd PRB |
| ptrsthRB1 <= $N_{PRB}$ | present on every 4th PRB |

The network can signal to the communication device using RRC signaling, the scheduling bandwidth thresholds in such table, e.g. ptrsthRBn, n=0, 1, per configured bandwidth part to adapt to phase noise characteristics of the transmitter and receiver.

Furthermore, when PTRS is configured to be present or not by a RRC parameter and if configured to be present, then PTRS can be present in every 2nd RB by default, unless DL/UL density tables thresholds are explicitly configured by RRC.

Furthermore, if two thresholds are configured as equal, then the associated density is not used at all (disabled). For example, in Table 1 below, if ptrsthRB0=ptrsthRB1 in the RRC configuration of thresholds, then "present on every 2nd RB" is not used for this communication device. Moreover, if ptrsthRB0=1, then PT-RS may always be present since the "PT-RS is not present" field can never be selected as the scheduled bandwidth must be positive. In addition, if ptrsthRB1=273, the maximal scheduling bandwidth (BW) in NR, for the last row of the table, then that row cannot be selected, i.e. that density is disabled.

SUMMARY

According to some embodiments of inventive concepts, a method for a UE in a multiple transmission points communication system, mTRP, scheme, is provided. The method includes receiving a higher layer configuration of a mTRP scheme. The method further includes receiving downlink control information, DCI, indicating a first and a second Transmission Configuration Indicator, TCI, state in one Code Division Multiplexing, CDM, group for a scheduled data transmission on physical resource blocks, PRBs. The PRBs includes at least a first subset of PRBs, associated with the first TCI state, and a second subset of PRBs, associated with the second TCI state. The method further includes determining a first Phase Tracking Reference Signal, PT-RS, frequency density for the first subset of PRBs based on the number of PRBs in the first subset of PRBs and a second PT-RS frequency density for the second subset of PRBs based on the number of PRBs in the second subset of PRBs.

According to some embodiments of inventive concepts, a UE operable in a multiple transmission points communication system, mTRP, scheme, is provided. The UE includes a transceiver and processing circuitry configured to receive a higher layer configuration of a mTRP scheme and to receive downlink control information, DCI, indicating a first and a second Transmission Configuration Indicator, TCI, state in one Code Division Multiplexing, CDM, group for a scheduled data transmission on physical resource blocks, PRBs. The PRBs includes at least a first subset of PRBs, associated with the first TCI state, and a second subset of PRBs, associated with the second TCI state. The transceiver and processing circuitry are further configured to determine a first Phase Tracking Reference Signal, PT-RS, frequency density for the first subset of PRBs based on the number of PRBs in the first subset of PRBs and a second PT-RS frequency density for the second subset of PRBs based on the number of PRBs in the second subset of PRBs.

According to some embodiments of inventive concepts, a method for a base station in a multiple transmission points communication system, mTRP, scheme, is provided. The method includes transmitting a higher layer configuration of a mTRP scheme. The method further includes transmitting downlink control information, DCI, indicating a first and a second Transmission Configuration Indicator, TCI, state in one Code Division Multiplexing, CDM, group for a scheduled data transmission on physical resource blocks, PRBs. The PRBs includes at least a first subset of PRBs, associated with the first TCI state, and a second subset of PRBs, associated with the second TCI state. The PT-RS frequency density for the first set of PRBs is obtainable based on the number of PRBs in the first set of PRBs and a PT-RS frequency density for the second set of PRBs is obtainable based on the number of PRBs in the second set of PRBs.

According to some embodiments of inventive concepts, a base station in a multiple transmission points communication system, mTRP, scheme, is provided. The base station includes a transceiver and processing circuitry configured to transmit a higher layer configuration of a mTRP scheme and to transmit a downlink control information, DCI, indicating a first and a second Transmission Configuration Indicator, TCI, state in one Code Division Multiplexing, CDM, group for a scheduled data transmission on physical resource blocks, PRBs. The PRBs includes at least a first subset of PRBs, associated with the first TCI state, and a second subset of PRBs, associated with the second TCI state. The PT-RS frequency density for the first set of PRBs is obtainable based on the number of PRBs in the first set of PRBs and a PT-RS frequency density for the second set of PRBs is obtainable based on the number of PRBs in the second set of PRBs.

Corresponding embodiments of inventive concepts for computer products, and computer programs are also provided.

An advantage provided by the inventive concepts is that the inverse frequency density is correctly determined for multiple transmission points to a communication device leading to enhanced performance when receiving PDSCH in the presence of phase noise.

The inventive concepts provide a solution to the problem of determining an inverse frequency density for FDM schemes 2a and 2b with multiple transmission points since the inverse frequency density depends on the scheduling bandwidth for a single transmission point transmission.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 10 is an illustration of an example of PT-RS present every 4th PRB when the PRG size is 2 and PDSCH scheduled from two TRPs associated with two TCI states according to some embodiments of inventive concepts;

FIG. 28 is a block diagram of methods implemented in a communication system including a host computer, a base station and a user equipment in accordance with some embodiments; and FIG. 29 is a block diagram of methods implemented in a communication system including a host computer, a base station and a user equipment in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 12:
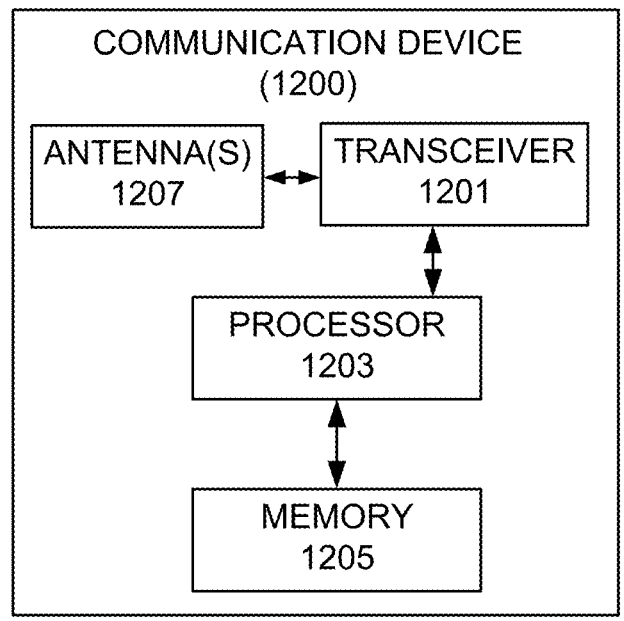
FIG. 12 is a block diagram illustrating a communication device according to some embodiments of inventive concepts.

FIG. 12 is a block diagram illustrating elements of a communication device 1200 (also referred to as a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Communication device 1200 may be provided, for example, as discussed below with respect to wireless device 4110 of FIG. 21.) As shown, the communication device may include an antenna 1207 (e.g., corresponding to antenna 4111 of FIG. 21), and transceiver circuitry 1201 (also referred to as a transceiver, e.g., corresponding to interface 4114 of FIG. 21) including a transmitter and a receiver configured to provide uplink and downlink radio communications with a base station(s) (e.g., corresponding to network node 4160 of FIG. 21, also referred to as a RAN node) of a radio access network. The communication device 1200 may also include processing circuitry 1203 (also referred to as a processor, e.g., corresponding to processing circuitry 4120 of FIG. 21) coupled to the transceiver circuitry, and memory circuitry 1205 (also referred to as memory, e.g., corresponding to device readable medium 4130 of FIG. 21) coupled to the processing circuitry. The memory circuitry 1205 may include computer readable program code that when executed by the processing circuitry 1203 causes the processing circuitry to perform operations according to embodiments disclosed herein. According to other embodiments, processing circuitry 1203 may be defined to include memory so that separate memory circuitry is not required. The communication device 1200 may also include an interface (such as a user interface) coupled with processing circuitry 1203, and/or wireless device UE may be incorporated in a vehicle.

As discussed herein, operations of communication device 1200 may be performed by processing circuitry 1203 and/or transceiver circuitry 1201. For example, processing circuitry 1203 may control transceiver circuitry 1201 to transmit communications through transceiver circuitry 1201 over a radio interface to a radio access network node (also referred to as a base station) and/or to receive communications through transceiver circuitry 1201 from a RAN node over a radio interface. Moreover, modules may be stored in memory circuitry 1205, and these modules may provide instructions so that when instructions of a module are executed by processing circuitry 1203, processing circuitry 1203 performs respective operations (e.g., operations discussed below with respect to Example Embodiments relating to communication devices).

Figure 13:
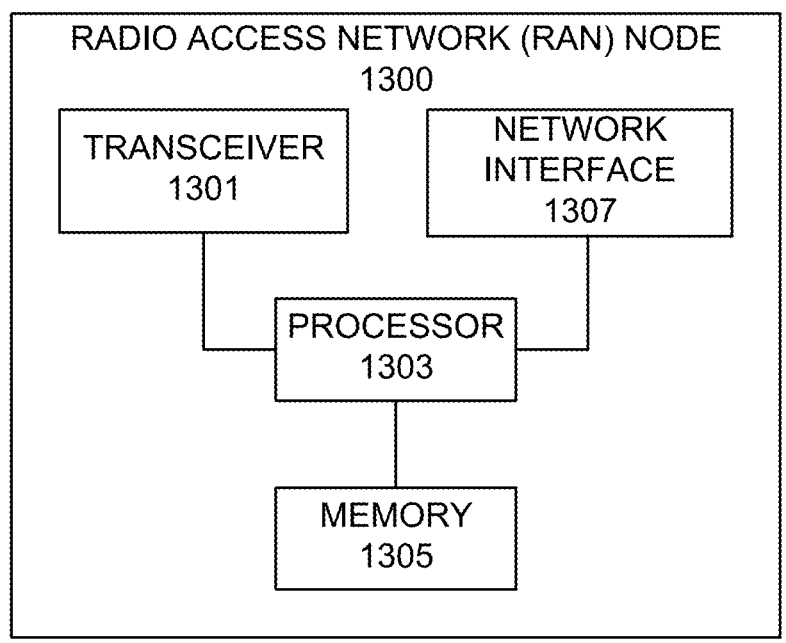
FIG. 13 is a block diagram illustrating a radio access network RAN node (e.g., a base station eNB/gNB) according to some embodiments of inventive concepts.

FIG. 13 is a block diagram illustrating elements of a radio access network RAN node 1300 (also referred to as a network node, base station, eNodeB/eNB, gNodeB/gNB, etc.) of a Radio Access Network (RAN) configured to provide cellular communication according to embodiments of inventive concepts. (RAN node 1300 may be provided, for example, as discussed below with respect to network node 4160 of FIG. 21.) As shown, the RAN node 1300 may include transceiver circuitry 1301 (also referred to as a transceiver, e.g., corresponding to portions of interface 4190 of FIG. 21) including a transmitter and a receiver configured to provide uplink and downlink radio communications with mobile terminals. The RAN node may include network interface circuitry 1307 (also referred to as a network interface, e.g., corresponding to portions of interface 4190 of FIG. 21) configured to provide communications with other nodes (e.g., with other base stations) of the RAN and/or core network CN. The network node 1300 may also include processing circuitry 1303 (also referred to as a processor, e.g., corresponding to processing circuitry 4170) coupled to the transceiver circuitry, and memory circuitry 1305 (also referred to as memory, e.g., corresponding to device readable medium 4180 of FIG. 21) coupled to the processing circuitry. The memory circuitry 1305 may include computer readable program code that when executed by the processing circuitry 1303 causes the processing circuitry to perform operations according to embodiments disclosed herein. According to other embodiments, processing circuitry 1303 may be defined to include memory so that a separate memory circuitry is not required.

As discussed herein, operations of the RAN node 1300 may be performed by processing circuitry 103, network interface 1307, and/or transceiver 1301. For example, processing circuitry 1303 may control transceiver 1301 to transmit downlink communications through transceiver 1301 over a radio interface to one or more communication devices and/or to receive uplink communications through transceiver 1301 from one or more communication devices over a radio interface. Similarly, processing circuitry 1303 may control network interface 1307 to transmit communications through network interface 1307 to one or more other network nodes and/or to receive communications through network interface from one or more other network nodes. Moreover, modules may be stored in memory 1305, and these modules may provide instructions so that when instructions of a module are executed by processing circuitry 1303, processing circuitry 1303 performs respective operations (e.g., operations discussed below with respect to Example Embodiments relating to RAN nodes).

According to some other embodiments, a network node may be implemented as a core network CN node 1400 without a transceiver. In such embodiments, transmission to a communication device may be initiated by the network node so that transmission to the communication device is provided through a network node including a transceiver (e.g., through a base station or RAN node). According to embodiments where the network node is a RAN node including a transceiver, initiating transmission may include transmitting through the transceiver.

Figure 14:
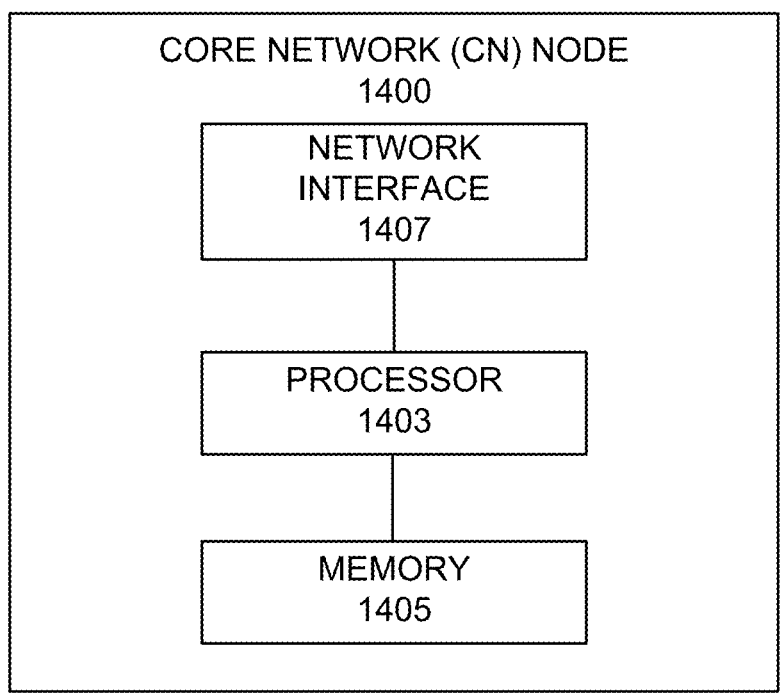
FIG. 14 is a block diagram illustrating a core network CN node (e.g., an AMF node, an SMF node, etc.) according to some embodiments of inventive concepts.

FIG. 14 is a block diagram illustrating elements of a core network CN node (e.g., an SMF node, an AMF node, etc.) of a communication network configured to provide cellular communication according to embodiments of inventive concepts. As shown, the CN node may include network interface circuitry 1407 (also referred to as a network interface) configured to provide communications with other nodes of the core network and/or the radio access network RAN. The CN node may also include a processing circuitry 1403 (also referred to as a processor) coupled to the network interface circuitry, and memory circuitry 1405 (also referred to as memory) coupled to the processing circuitry. The memory circuitry 1405 may include computer readable program code that when executed by the processing circuitry 1403 causes the processing circuitry to perform operations according to embodiments disclosed herein. According to other embodiments, processing circuitry 1403 may be defined to include memory so that a separate memory circuitry is not required.

As discussed herein, operations of the CN node may be performed by processing circuitry 1403 and/or network interface circuitry 1407. For example, processing circuitry 1403 may control network interface circuitry 1407 to transmit communications through network interface circuitry 1407 to one or more other network nodes and/or to receive communications through network interface circuitry from one or more other network nodes. Moreover, modules may be stored in memory 1405, and these modules may provide instructions so that when instructions of a module are executed by processing circuitry 1403, processing circuitry 1403 performs respective operations (e.g., operations discussed below with respect to Example Embodiments relating to core network nodes).

Figure 1:
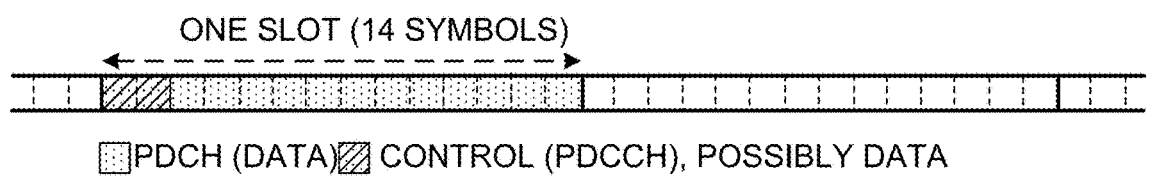
FIG. 1 is an illustration of a NR time-domain structure with 15 kHz subcarrier spacing.
Figure 2:
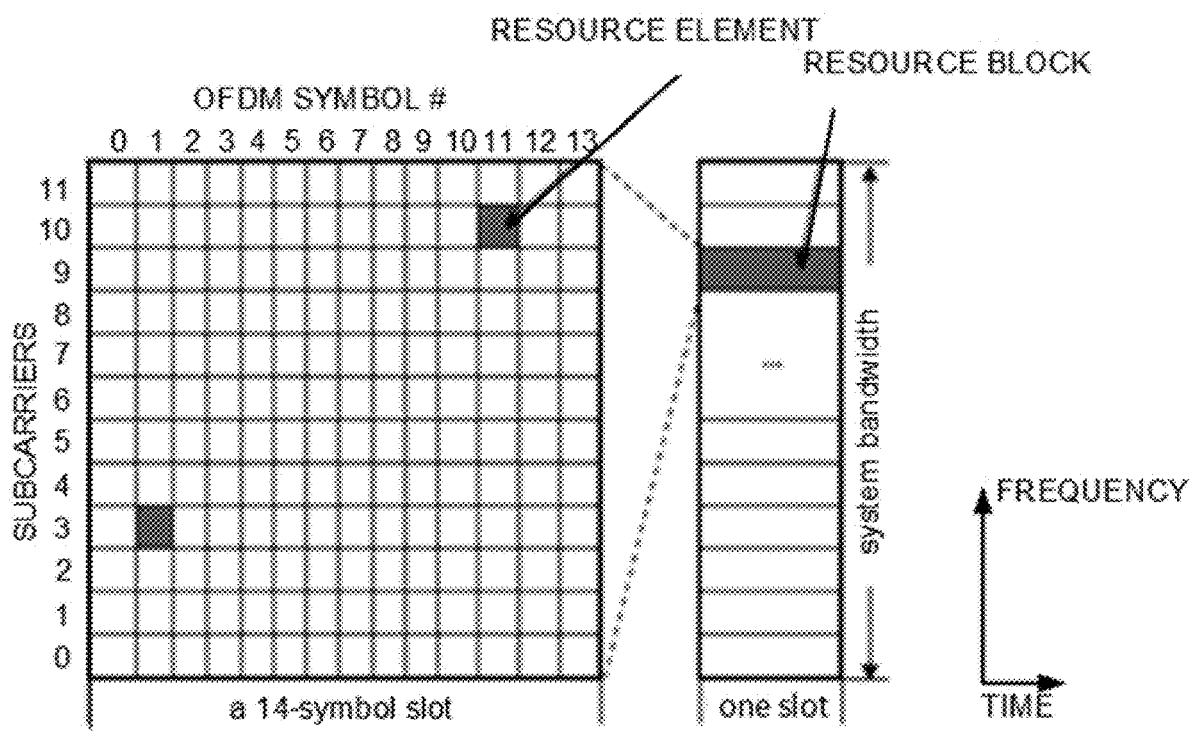
FIG. 2 is an illustration of a NR physical resource grid.
Figure 3:
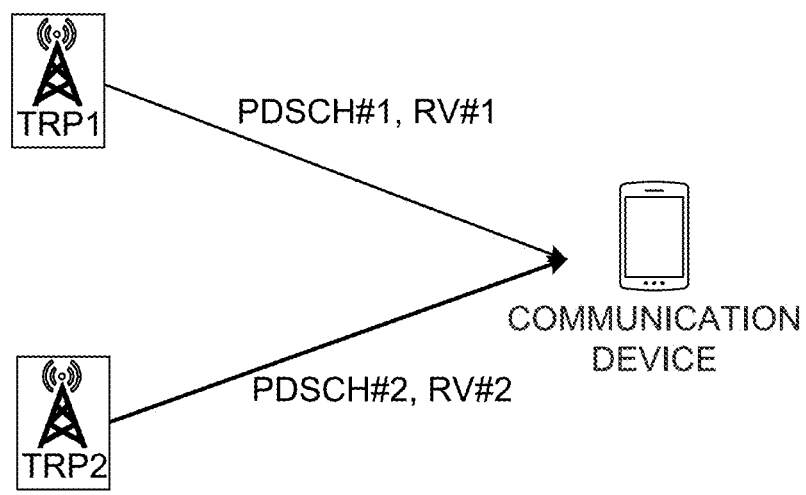
FIG. 3 is an illustration of an example of data transmission over multiple TRPs for increasing reliability according to some embodiments.

Reliable data transmission with multiple panels or multiple transmission points (TRPs) has been proposed in 3GPP for Rel-16, in which a data packet may be transmitted over multiple TRPs (multi-TRP) to achieve diversity. An example is shown in FIG. 3, where the two PDSCHs carry the same encoded data payload but with the same or different redundancy versions (RVs) so that the UE can do soft combining of the two PDSCHs to achieve more reliable reception. The two PDSCHs can be frequency division multiplexed (FDM) in a same slot, or time division multiplexed (TDM) in different slots or mini-slots within a slot.

Different schemes have been identified in 3GPP for PDSCH transmissions from multiple TRPs, including, for example, Scheme 2a and Scheme 2b as defined below:

Scheme 2 (FDM): two TCI states within a single slot, with non-overlapped frequency resource allocation Each non-overlapped frequency resource allocation is associated with one TCI state.

Same single/multiple DMRS port(s) are associated with all non-overlapped frequency resource allocations.

Scheme 2a:
Single codeword with one RV is used across full resource allocation. From UE perspective, the common RB mapping (codeword to layer mapping as in Rel-15) is applied across full resource allocation.

Scheme 2b:
Single codeword with one RV is used for each non-overlapped frequency resource allocation. The RVs corresponding to each non-overlapped frequency resource allocation can be the same or different.

The scheduled bandwidth can be divided into odd and even groups of adjacent RBs, knows as precoding resource block groups (PRGs). For example TRP1 may be using odd PRGs and TRP2 may be using even PRGs (or vice versa). In specification language, TCI state #1/#2 is associated with reception in even/odd PRGs respectively. The PRG size can be 2 or 4 resource blocks (RB) where a RB consists of 12 subcarriers. One exception is that PRG size can also be configured as wideband. When PRG size is configured as wideband, the first half of the scheduled bandwidth for PDSCH may be assigned to TCI state #1 (i.e. TRP1) and second half of the scheduled bandwidth for PDSCH may be assigned to TCI state #2 (i.e., TRP2).

Figure 4:
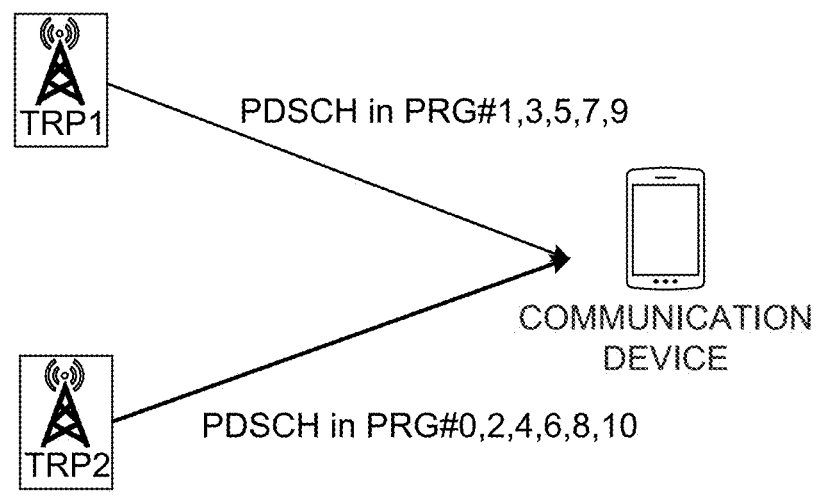
FIG. 4 is an illustration of an example of FDM Scheme 2a according to some embodiments.

FIG. 4 illustrates an example of a FDM scheme with a single CW (Scheme 2a) in which a PDSCH is scheduled in a bandwidth of 11 PRGs and is transmitted in PRG #1, 3, 5, 7, 9 from TRP1 and PRG #0, 2, 4, 6, 8, 10 from TRP2. In this example, the 1st TCI state is associated with TRP2 and the 2nd TCI state is associated with TRP1.

Figure 5:
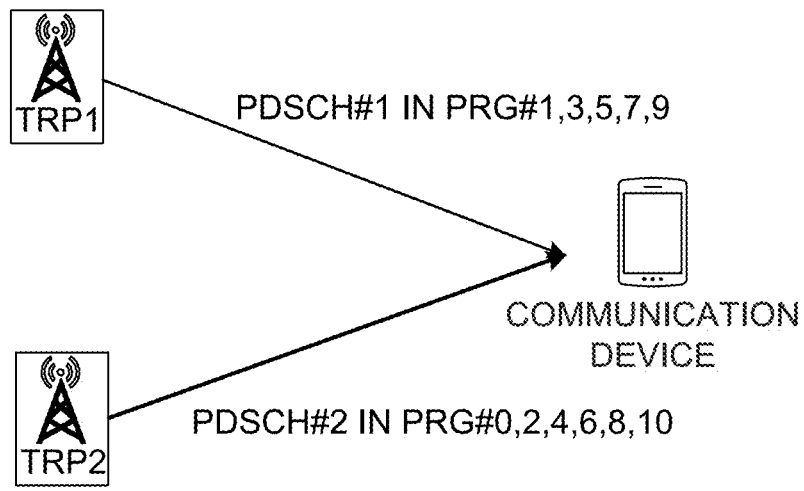
FIG. 5 is an illustration of an example of FDM Scheme 2b according to some embodiments.

FIG. 5 shows the corresponding example of FDM scheme 2b with 2 CWs (2 PDSCH) in which PDSCH #1 with CW #1 is transmitted in PRG #1, 3, 5, 7, 9 from TRP1 and PDSCH #2 with CW #2 is transmitted in PRG #0, 2, 4, 6, 8, 10 from TRP2. In this example, the 1st TCI state is associated with TRP2 and the 2nd TCI state is associated with TRP1. Both PDSCH #1 and PDSCH #2 are for a same transport block, TB and may have a same RV or different RVs.

The PT-RS inverse frequency density $K_{PT-RS}$ depends on the scheduling bandwidth for single TRP transmission (as in Rel.15). In previous systems, a problem is how to determine $K_{PT-RS}$ for the case of FDM Scheme 2a and FDM Scheme 2b with multi-TRP.

According to some embodiments of inventive concepts, in scheme 2a and/or 2b, the value used for the scheduled bandwidth $N_{PRB}$ when determining $K_{PT-RS}$ from Table 1 is a function of X, for example ceil(X/2), where X is the total number of scheduled resource blocks in the scheme 2a and/or 2b resource allocation as indicated by DCI. One advantage is that the PT-RS density is correctly assigned also for multi-TRP transmissions leading to enhanced performance when receiving PDSCH from different TRPs in the presence of phase noise.

In Scheme 2a and 2b, each PRG is utilized for transmission by one of the two TRPs only (i.e., each PRG is associated with only one of the two TCI states indicated in DCI). Also, the DM-RS ports are from one CDM group only according to agreement with a comb-based frequency allocation transmission, divided into odd and even PRGs (except in the case of wideband PRG, in which case two continuous chunks or RBs are used per TRP). The same DM-RS port number(s) is used in the odd and even PRGs, hence there is no need to configure two PT-RS ports in scheme 2a and 2b.

Figure 6:
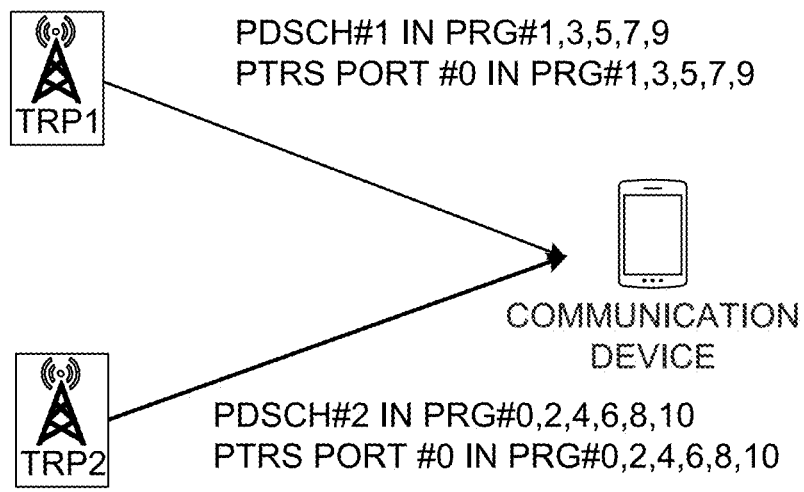
FIG. 6 is an illustration of using a single PTRS port for Schemes 2a or 2b with PRG size of 2 or 4 RBs according to some embodiments of inventive concepts.
Figures 7, 8:
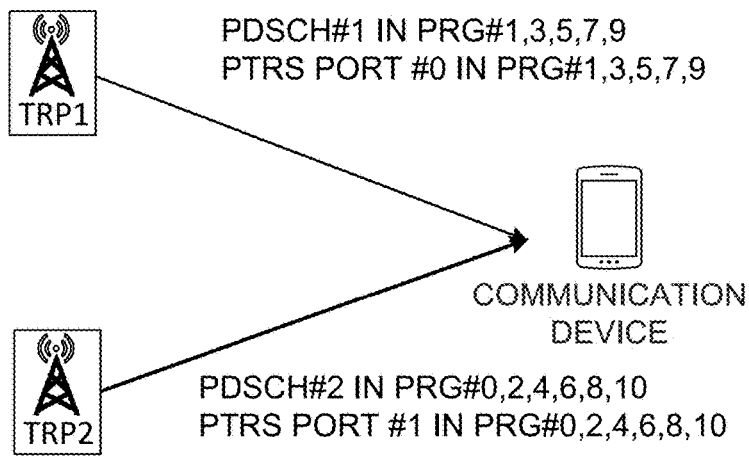
FIG. 7 is an illustration of using two PTRS ports for Schemes 2a or 2b with PRG size of 2 or 4 RBs according to some embodiments of inventive concepts.
FIG. 8 is an illustration of an example of PTRS RB allocation in Scheme 2a with $K_{PT-RS}=4$ and PRG size of 4 RBs according to some embodiments of inventive concepts.

In Scheme 2a and 2b, in one embodiment, a single PT-RS port is used. If two PT-RS ports have been configured (in case dynamic switching between schemes, e.g., between scheme 1a (in which two PT-RS ports are needed) and scheme 2a/2b, is supported), then only the PT-RS port associated with the lowest index DM-RS port is transmitted. An example is shown in FIG. 6, where 11 PRGs are allocated for PDSCH. PTRS port #0 in PRG #1, 3, 5, 7, 9 is transmitted from TRP 1 and PTRS port #0 in PRG #0, 2, 4, 6, 8, 10 is transmitted from TRP2. In an alternative embodiment, two PT-RS ports are used but only one of the port is transmitted in any given PRG hence even numbered PRGs transmit one PT-RS port while odd numbered PRG transmit the alternative PT-RS port. The UE thus receive only one PT-RS port per RB (or PRG). An example is shown in FIG. 7 where two PTRS ports are used. PTRS port #0 is only transmitted in PRG #1, 3, 5, 7, 9 from TRP 1 while PTRS port #1 is only transmitted in PRG #0, 2, 4, 6, 8, 10 from TRP2

In scheme 2a, the communication device should not assume that the communication device can use the PT-RS transmissions (i.e. the PT-RS in those subcarriers) from PDSCH PRG associated with different TCI states in a joint manner, when using PT-RS for tracking the phase. Hence, phase tracking may need to be estimated for each of the two groups of odd and even PRG separately. (Or the lower and higher set of RB in case of wideband PRG configuration). The communication device thus performs phase tracking on the PT-RS received in the odd PRG to demodulate the PDSCH (or part of the PDSCH) received in the odd PRGs.

In scheme 2a a single PDSCH is scheduled, but only half of the frequency domain PT-RS samples in an OFDM symbol containing the PDSCH can be used for phase tracking, for the PDSCH received on the same PRGs as the PT-RS associated with each TCI state, as explained above. An example is shown in FIG. 8, which is an example of PTRS RB allocation in Scheme 2a with $K_{PT-RS}=4$ and PRG size of 4 RBs. Here, a total of 6 PRGs are scheduled but due to the use of two TRPs, only three PRGs are allocated for each TRP and three samples are available for the PT-RS reception of the transmission from one TRP.

Thus, the number of PT-RS samples in frequency may be too low for good performance. To compensate for this loss, the PT-RS density may be increased when PDSCH of Scheme 2a is scheduled.

For example, in scheme 2a, the determined $K_{PT-RS}$ from Table 5.1.6.3-2 in 3GPP TS 38.214 v15.6.0 may be modified such that the modified PT-RS density $\hat{K}_{PT-RS}$ is used for the scheduled PDSCH. For example, the inverse frequency density may be modified as $\hat{K}_{PT-RS}=\lfloor \alpha K_{PT-RS} \rfloor$ where $\alpha$ can be ½ or ⅓ as typical values. Another example on how to modify the inverse frequency density is $\hat{K}_{PT-RS}=K_{PT-RS}-1$. Table 5.1.6.3-2 of 3GPP TS 38.214 v15.6.0 is reproduced below where $NRB_O$ and $NRB_1$ are threshold values as discussed above with respect to Table 1.

| 3GPP TS38.214 TABLE 5.1.6.3-2: Frequency density of PT-RS as a function of scheduled bandwidth | |
| --- | --- |
| Scheduled bandwidth | Frequency density ($K_{PT-RS}$) |
| $N_{RB} < N_{RB0}$ | PT-RS is not present |
| $N_{RB0} \leq N_{RB} < N_{RB1}$ | 2 |
| $N_{RB1} \leq N_{RB}$ | 4 |

Figure 9:
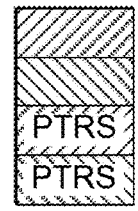
FIG. 9 is an illustration of an example of PTRS for scheme 2a with $\hat{K}_{PT-RS}=\lfloor K_{PT-RS}/2 \rfloor$, $K_{PT-RS}=4$ and PRG size of 4 RBs according to some embodiments of inventive concepts.

An example with $\hat{K}_{PT-RS} = \lfloor K_{PT-RS}/2 \rfloor$ is shown in FIG. 9 for the same PTRS configuration as in FIG. 8. FIG. 9 illustrates an example of PTRS for scheme 2a with $\hat{K}_{PT-RS} = \lfloor K_{PT-RS}/2 \rfloor$, $K_{PT-RS} = 4$ and PRG size of 4 RBs.

In another embodiment, when scheme 2a is signaled, the scheduled bandwidth, $N_{RB}$, in Table 1 (corresponding to Table 5.1.6.3-2 of 3GPP TS 38.214 v15.6.0, which is reproduced below) for PTRS frequency density configuration is defined as the number of RBs associated with the first TCI state (or equivalently the second could also be the choice) indicated in a DCI. For the example shown in FIG. 8, $N_{RB} = 12$ would be used instead of $N_{RB} = 24$.

| 3GPP TS 38.214 Table 5.1.6.3-2: Frequency density of PT-RS as a function of scheduled bandwidth | |
| --- | --- |
| Scheduled bandwidth | Frequency density ($K_{PT-RS}$) |
| $N_{RB} < N_{RB0}$ | PT-RS is not present |
| $N_{RB0} \leq N_{RB} < N_{RB1}$ | 2 |
| $N_{RB1} \leq N_{RB}$ | 4 |

Alternatively, in scheme 2a, the value used for the bandwidth $N_{RB}$ when determining $K_{PT-RS}$ from Table 5.1.6.3-2 in TS 38.214 is the number of resource blocks (RB) for the PRGs of the PDSCH which are associated with one of the TCI states, for example the PRG associated with the first of the two TCI states.

For Scheme 2b, the procedure may be simpler, as there are two CW transmitted, and thus possibly this can be specified so that two PDSCH transmitted (or alternatively as one PDSCH with two CW that map to different RB respectively). A rule can then be based on the following:

In scheme 2b, the PT-RS resource element mapping is established for each of the two PDSCH independently (i.e. to the scheduled resources of the PDSCH). The communication device should not use PT-RS of one PDSCH as the PT-RS for the other PDSCH.

Moreover, in scheme 2b, the actual number of RB used for transmission from one TRP, i.e. per PDSCH, is roughly 50% of the total number of scheduled RB since the resource allocation indicates the total resources used for both PDSCH. Hence, to correctly assign the inverse frequency density $K_{PT-RS}$ of the PT-RS for each PDSCH, only 50% of the total scheduled bandwidth should be assumed per PDSCH.

Hence, in scheme 2b, the value used for the bandwidth $N_{RB}$ when determining $K_{PT-RS}$ from Table 5.1.6.3-2 in TS 38.214 is a function of X, for example ceil(X/2) or floor (X/2) where X is the total number of scheduled resource blocks in the scheme 2b resource allocation, which is indicated in the scheduling DCI.

Alternatively, in scheme 2b, the value used for the bandwidth $N_{RB}$ when determining $K_{PT-RS}$ from Table 5.1.6.3-2 in TS 38.214 is the number of resource blocks (RB) for the PDSCH associated with one of the TCI states, for example the PDSCH associated with the first TCI state.

In another embodiment of scheme 2b, the value used for the bandwidth $N_{RB}$ when determining $K_{PT-RS}$ from Table 5.1.6.3-2 in TS 38.214 is the actual indicated value in the DCI. The determined $K_{PT-RS}$ from Table 5.1.6.3-2 in TS 38.214 is then modified to the PT-RS density $\hat{K}_{PT-RS}$ to be used for the scheduled PDSCH. For example $\hat{K}_{PT-RS} = \lceil \alpha K_{PT-RS} \rceil$ where a can be ½ or ⅓ as typical values. Another example on how to modify the inverse frequency density is $\hat{K}_{PT-RS} = K_{PT-RS} - 1$.

Determination of PT-RS Density Taking into Account PRG Size

Figure 10:
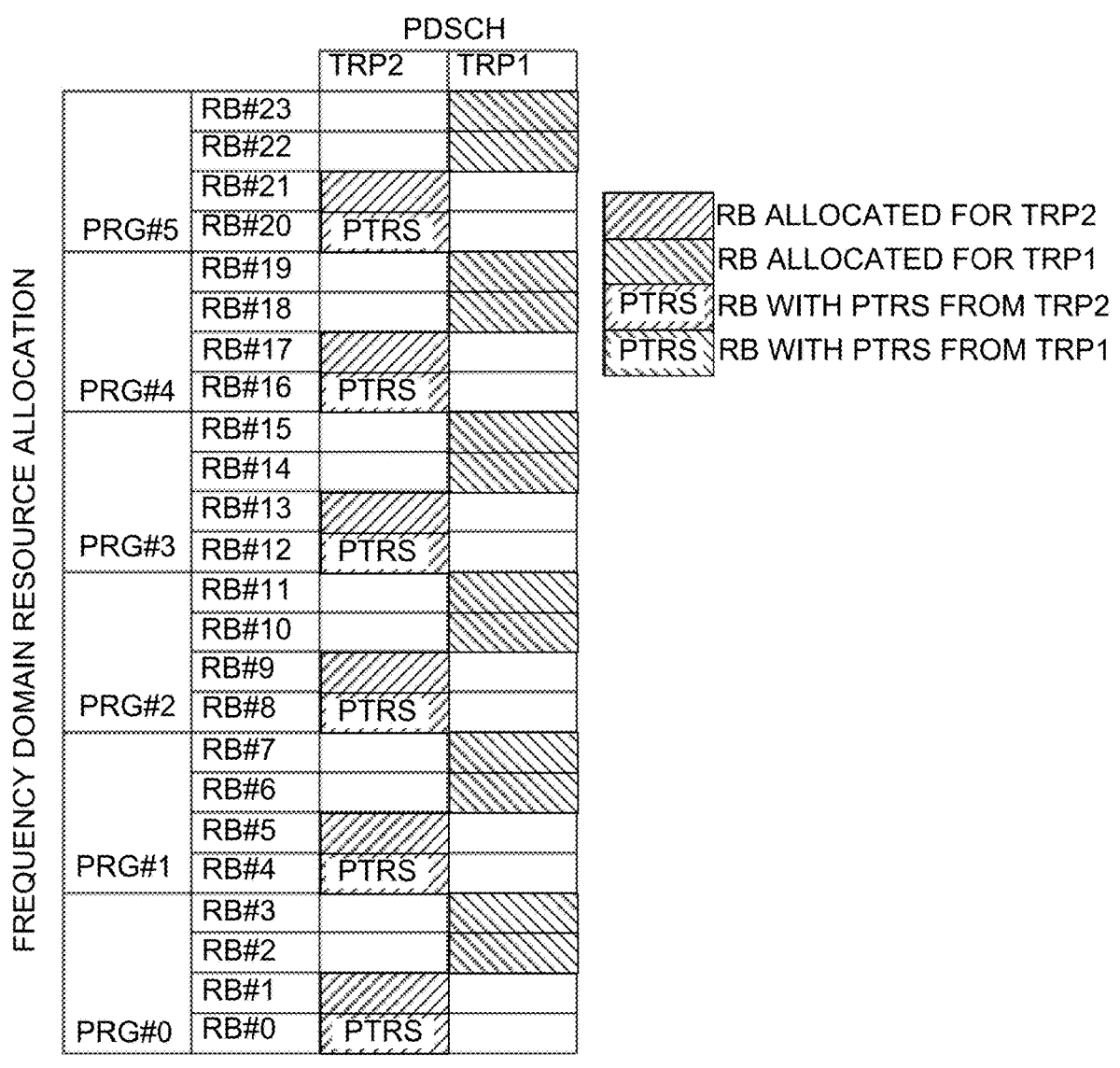

Using the NR Rel-15 procedure, the inverse frequency density ($K_{PT-RS}$) is determined taking into account the scheduled PDSCH bandwidth, and the two thresholds ptrsthRB0 and ptrsthRB1 as per function defined in Table 1. Based on the procedure, it may be determined that the PT-RS is present on every $4^{th}$ PRB. Further consider in this case that the PRG size is two and PRGs 0 to 11 are used to schedule PDSCH with schemes 2a or 2b. As shown in FIG. 10, PRGs 0, 2, 4, 6, 8, and 10 are allocated to TRP2 which is associated with the $1^{st}$ TCI state, and PRGs 1, 3, 5, 7, 9, and 11 are allocated to TRP1 which is associated with the $2^{nd}$ TCI state. However, following NR Rel-15 procedure with PTRS being determined to be present in every $4^{th}$ PRB results in the case that PT-RS is only transmitted in RBs corresponding to the $1^{st}$ TCI state (i.e., RBs transmitted from TRP 2). There will be no PTRS transmitted on RBs scheduled for TRP1 which is associated with the $2^{nd}$ TCI state.

This issue of no PTRS transmitted on RBs scheduled for TRP1 which is associated with the $2^{nd}$ TCI state can be resolved if the PRG size is also taken into account when determining the inverse frequency density of PT-RS for multi-TRP FDM schemes 2a/2b. In one embodiment, the inverse frequency density of PT-RS is not expected to exceed PRG size for schemes 2a/2b. For instance, if PRG size is 2 for multi-TRP FDM schemes 2a/2b, then the UE does not expect the thresholds ptrsthRB0 and ptrsthRB1 to be configured which results in PT-RS being present on every $4^{th}$ PRB. Alternatively stated, when PRG size is 2 for multi-TRP FDM schemes 2a/2b, the following are the only valid possibilities:

PT-RS is not present

PT-RS is present on every $2^{nd}$ PRB

In an alternate embodiment, if it is determined using NR Rel-15 procedures that PT-RS is present in every $N^{th}$ PRB, where N is greater than the PRG size, then the determined inverse frequency density of PTRS is overridden and N is set equal to the PRG size.

Figure 11:
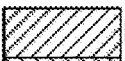
FIG. 11 is an illustration of an example of PT-RS present every 2nd PRB when the PRG size is 2 and PDSCH scheduled from two TRPs associated with two TCI states according to some embodiments of inventive concepts.

As shown in FIG. 11, when PTRS inverse frequency density is set equal to the PRG size, PT-RS is transmitted in RBs corresponding to both the $1^{st}$ TCI state (i.e., RBs transmitted from TRP 2) and $2^{nd}$ TCI state (i.e., RBs transmitted from TRP 1).

In a further embodiment, a second set of thresholds ptrsthRB0 and ptrsthRB1 as used in Table 2, are signaled from the network to the communication device. Hence the communication can be configured with two sets of PT-RS thresholds where the first set is used for "normal" mobile broadband services such as defined in Rel.15, while the second set is used when Scheme 2a or 2b is scheduled. Thus, depending on the service type (i.e. the transmission scheme), different thresholds applies in determining the PT-RS density. This allows for increasing the PT-RS density (as a function of scheduled PDSCH bandwidth $N_{PRB}$ as indicated in the scheduling DCI) when Scheme 2a or 2b is scheduled, and use the normal PT-RS density when Scheme 2a or 2b is not scheduled (e.g., when normal Rel.15 PDSCH is scheduled).

TABLE 2

NR inverse frequency density of PT-RS as a function of scheduled PDSCH bandwidth when Scheme 2a or 2b is scheduled

| Scheduled bandwidth | Inverse frequency density ($K_{PT-RS}$) |
| --- | --- |
| $N_{PRB}$ < ptrsthRB2 | PT-RS is not present |
| ptrsthRB2 <= $N_{PRB}$ < ptrsthRB3 | present on every 2nd PRB |
| ptrsthRB3 <= $N_{PRB}$ | present on every 4th PRB |

Thus, when the communication device is configured to receive a multi-TRP scheme 2a or 2b (i.e. FDM scheme) with two TCI states, the DCI indicates the scheduled resource blocks, which are divided into two non-overlapping subsets. Each subset is associated with its individual TCI state, to allow transmission from two different transmission points respectively. In this case, the determination of $K_{PT-RS}$ includes at least one of the following steps:

The scheduling bandwidth X as indicated in the DCI is modified (e.g. reduced)

The inverse frequency density is reduced

Taking into account PRG size while determining $K_{PT-RS}$ such that $K_{PT-RS}$ is not expected to exceed PRG size for schemes 2a/2b (only applicable when wideband PRG size is not configured).

Now that the details of the schemes 2a and 2b have been described, operations of the communication device 1200 to utilize the schemes 2a and 2b (implemented using the structure of the block diagram of FIG. 12) will now be discussed with reference to the flow chart of FIG. 15 according to some embodiments of inventive concepts. For example, modules may be stored in memory 1205 of FIG. 12, and these modules may provide instructions so that when the instructions of a module are executed by respective communication device processing circuitry 1203, processing circuitry 1203 performs respective operations of the flow chart.

Figure 15:
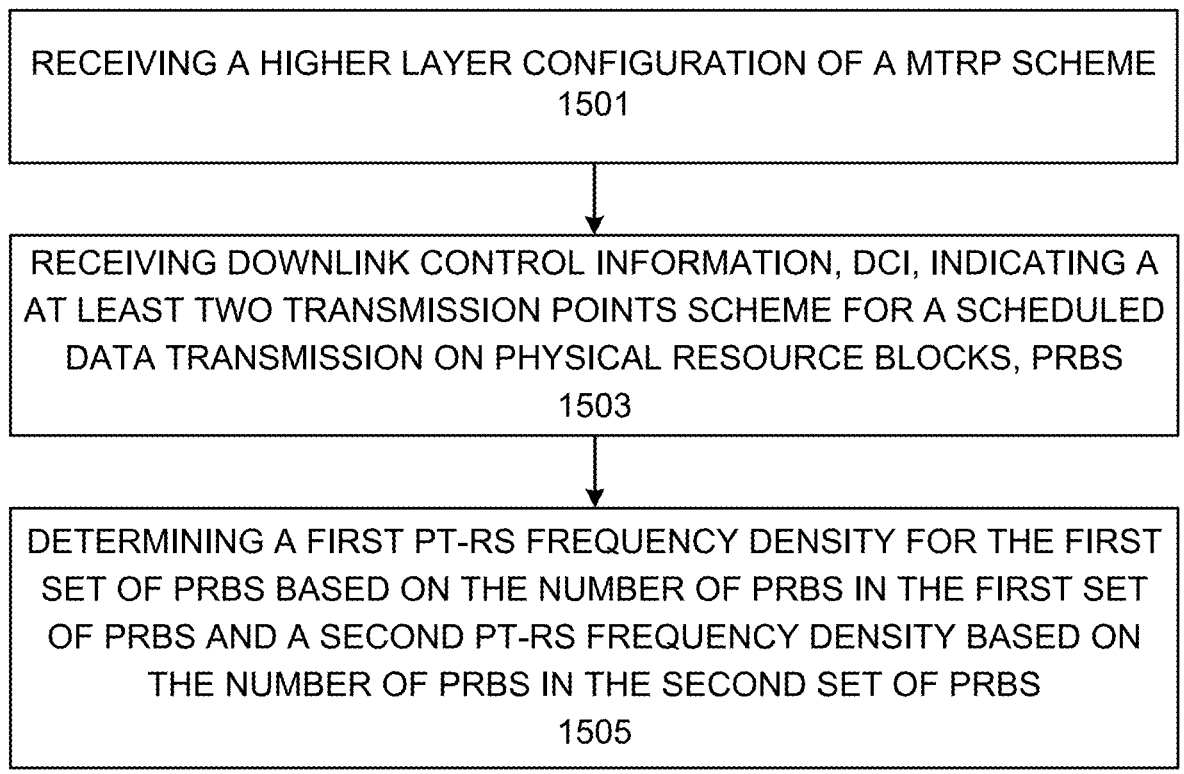
FIG. 15 is a flow chart illustrating operations of a communications device according to some embodiments of inventive concepts.

In block 1501 of FIG. 15 the processing circuitry 1203 may receive, via transceiver 1201 and/or antenna(s) 1207, a higher layer configuration of a mTRP scheme. The higher layer configuration may be a RRC configuration.

In block 1503, the processing circuitry 1203 may receive, via transceiver 1201 and antenna(s) 1207, downlink control information (DCI). The DCI maybe a Format 1_1 or 1_2. The DCI may indicate a at least two transmission points scheme for a scheduled data transmission on physical resource blocks, for example, in the DCI the UE is indicated with two TCI states in a codepoint of the DCI field 'Transmission Configuration Indication'. A TCI state corresponds to a transmission point. Through-out the embodiments a TCI state and a transmission point may be used interchangeably. Similarly, the DCI may indicate a first and a second Transmission Configuration Indicator, TCI, state in one Code Division Multiplexing, CDM, group for a scheduled data transmission on physical resource blocks, PRBs. The PRBs comprise at least a first subset of PRBs, associated with the first TCI state, and a second subset of PRBs, associated with the second TCI state. In a preferred embodiment the indicated scheme is FDM scheme 2a. However, other schemes such as FDM scheme 2b may also apply. The scheduled data transmission may include a PDSCH transmission from a RAN node 1300 such as base station. The data transmission may also be scheduled by the DCI.

The physical resource blocks (PRBs) may include at least a first subsets of PRBs, associated with a first transmission point, and a second subset of PRBs, associated with a second transmission point as shown in FIGS. 8 and 9. In FIG. 8 the PRBs of the scheduled PDSCH belong to a Precoding resource block group (PRG). The scheduled bandwidth is divided into odd and even groups PRGs. The PRBs belonging to even numbered PRGs are associated with a first transmission point, TRP1, i.e. a first TCI state, and the PRBs belonging to odd numbered PRGs are associated with a second transmission point, TRP 2, i.e. a second TCI state.

In block 1505, the processing circuitry 1203 may determine a first PT-RS frequency density for the first set of PRBs based on the number of PRBs in the first set of PRBs and a second PT-RS frequency density based on the number of PRBs in the second set of PRBs. For example, in the embodiments shown in FIGS. 8 and 9, a PT-RS frequency density is determined for the PRBs associated with TRP 1 and another PT-RS frequency density is determined for the PRBs associated with TRP 2. The PT-RS frequency density may include the inverse frequency density.

Operations of a RAN node 1300 (implemented using the structure of FIG. 13) will now be discussed with reference to the flow chart of FIG. 16 according to some embodiments of inventive concepts. For example, modules may be stored in memory 1305 of FIG. 13, and these modules may provide instructions so that when the instructions of a module are executed by respective RAN node processing circuitry 1303, processing circuitry 1303 performs respective operations of the flow chart.

In block 1601, the processing circuitry 1303 may transmit, via network interface 1307 and/or transceiver 1301 a higher layer configuration of a mTRP scheme. The higher layer configuration may be a RRC configuration.

In block 1603, the processing circuitry 1303 may transmit, via network interface 1307 and/or transceiver 1301, DCI to the communication device. The DCI maybe a Format 1_1 or 1_2. The DCI may indicate a at least two transmission points scheme for a scheduled data transmission on physical resource blocks, for example, in the DCI the UE is indicated with two TCI states in a codepoint of the DCI field 'Transmission Configuration Indication'. A TCI state corresponds to a transmission point. Through-out the embodiments a TCI state and a transmission point may be used interchangeably. Similarly, the DCI may indicate a first and a second Transmission Configuration Indicator, TCI, state in one Code Division Multiplexing, CDM, group for a scheduled data transmission on physical resource blocks, PRBs. The PRBs comprise at least a first subset of PRBs, associated with the first TCI state, and a second subset of PRBs, associated with the second TCI state. In a preferred embodiment indicated scheme is FDM scheme 2a. However, other schemes such as FDM scheme 2b may also apply. The scheduled data transmission may include a PDSCH transmission from the RAN node 1300. The data transmission may also be scheduled by the DCI.

Thereby, the PT-RS frequency density for the first set of PRBs is obtainable based on the number of PRBs in the first set of PRBs and a PT-RS frequency density for the second set of PRBs is obtainable based on the number of PRBs in the second set of PRBs.

FURTHER EMBODIMENTS

Further exemplary embodiments of the communication device 1200 and RAN node 1300 are described below. The various embodiments of FIGS. 17 and 18 may be optional.

Figure 17:
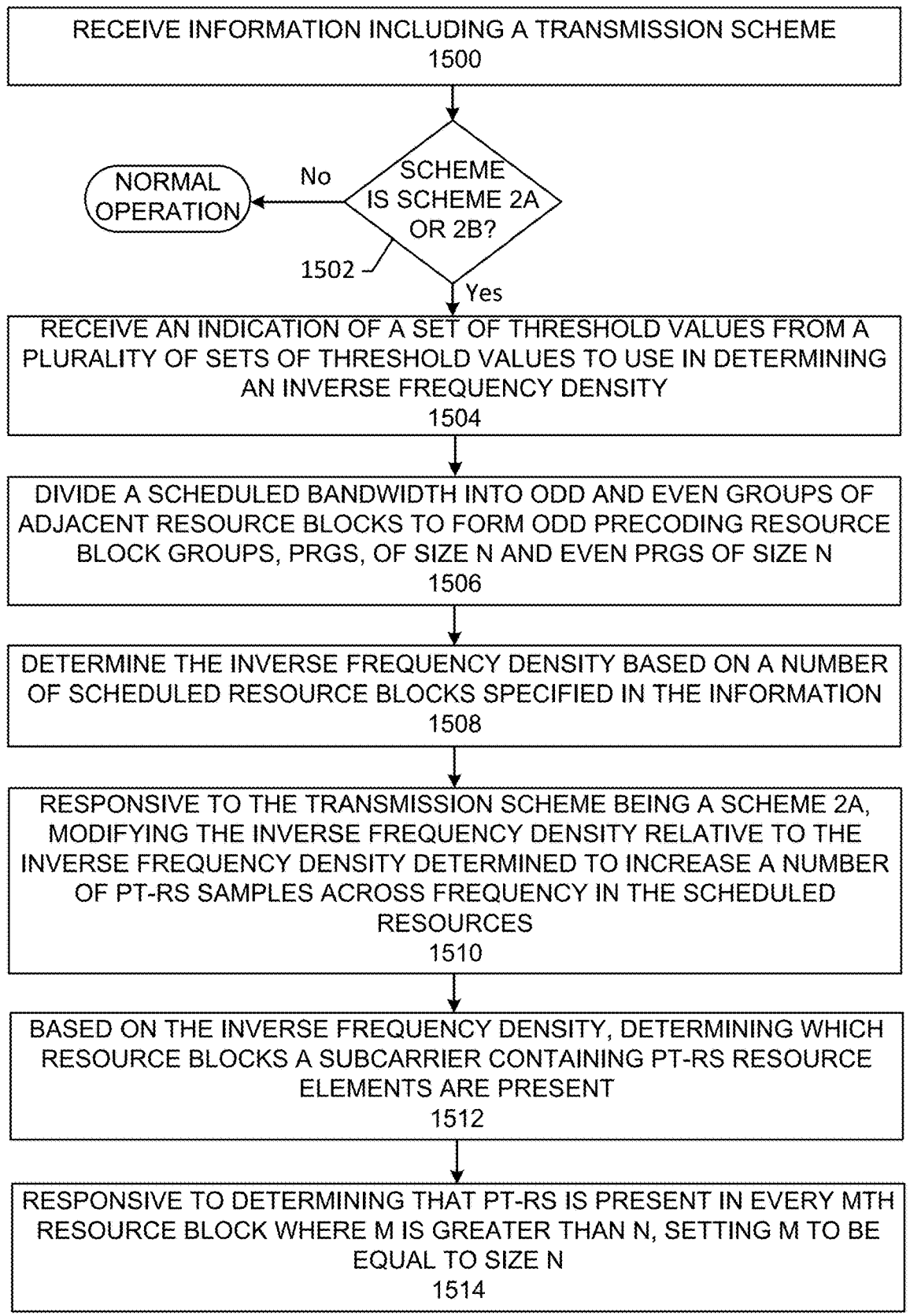
FIG. 17 is a flow chart illustrating operations of a communications device according to some embodiments of inventive concepts.

Turning to FIG. 17, in block 1500, the processing circuitry 1203 may receive, via transceiver 1201 and antenna(s) 1207, information including a transmission scheme. The transmission scheme can be a normal operation transmission scheme, a scheme 2a, or a scheme 2b. The scheme 2a and the scheme 2b may be indicated by the information indicating that the scheme receives two physical downlink data channel, PDSCH, simultaneously in different frequency resources, where each PDSCH is associated with a transmission configuration indicator, TCI, state specified in the information.

Thus, the processing circuitry 1203 may determine that the transmission scheme is a scheme receiving two physical downlink data channel, PDSCH, simultaneously in different frequency resources, where each PDSCH is associated with a transmission configuration indicator, TCI, state. This indicates that the transmission scheme is scheme 2a or scheme 2b. In block 1502, the processing circuitry 1203 may determine if the transmission scheme is a scheme receiving two physical downlink data channel, PDSCH, simultaneously in different frequency resources, where each PDSCH is associated with a transmission configuration indicator, TCI, state specified in the information received (e.g., the transmission scheme is scheme 2a or scheme 2b).

In block 1504, the processing circuitry 1203 may receive an indication of a set of threshold values from a plurality of sets of threshold values to use in determining the inverse frequency density described herein. Receiving the indication may include receiving a first set of threshold values of the plurality of sets of threshold values responsive to the transmission scheme being the scheme 2b. Receiving the indication may include receiving a second set of threshold values of the plurality of sets of threshold values responsive to the transmission scheme being other than the scheme 2b.

In block 1506, the processing circuitry 1203 may divide a scheduled bandwidth into odd and even groups of adjacent resource blocks to form odd precoding resource block groups, PRGs, of size N and even PRGs of size N.

In block 1508, the processing circuitry 1203 may determine an inverse frequency density based on a number of scheduled resource blocks specified in the information. In one embodiment, the processing circuitry 1203 may determine the inverse frequency density based on half of the number of scheduled resource blocks. In one embodiment, the processing circuitry 1203 may determine the inverse frequency density based on a third of the number of scheduled resource blocks. In another embodiment, the processing circuitry 1203 may determine the inverse frequency density based on a number of scheduled resource blocks by comparing a modification (e.g., ⅓, ½, etc.) of the number of scheduled resource blocks to threshold values to determine the inverse frequency density. In a further embodiment, the processing circuitry 1203 may determine the inverse frequency density based on a number of scheduled resource blocks by determining the inverse frequency density based on a subset of the scheduled resource blocks that are associated to one of two TCI states.

In another embodiment, the processing circuitry 1203 may determine the inverse frequency density based on a number of scheduled resource blocks by comparing the number of scheduled resource blocks to the set of threshold values. Responsive to the number of scheduled resource blocks being above a first threshold number of the set of threshold values and below a second threshold number of the set of threshold values, the processing circuitry 1203 may determine that the PT-RS is present on every second resource block. Responsive to the number of scheduled resource blocks being above the first threshold number of the set of threshold values and above the second threshold number of the set of threshold values, the processing circuitry 1203 may determine that the PT-RS is present on every fourth resource block.

In block 1510, responsive to the transmission scheme being a scheme 2a, the processing circuitry 1203 may modify the inverse frequency density relative to the inverse frequency density determined to increase a number of PT-RS samples across frequency in the scheduled resources.

In bock 1512, based on the inverse frequency density, the processing circuitry 1203 may determine which resource blocks a subcarrier containing PT-RS resource elements are present. For example, as described above, the processing circuitry 1203 may determine a PT-RS is present on every second PRB or present on every fourth PRB. Thus, the processing circuitry 1203 may compare the number of scheduled resource blocks to the set of threshold values. Responsive to the number of scheduled resource blocks being above a first threshold number of the set of threshold values and below a second threshold number of the set of threshold values, the processing circuitry 1203 may determine that the PT-RS is present on every second resource block. Responsive to the number of scheduled resource blocks being above the first threshold number of the set of threshold values and above the second threshold number of the set of threshold values, the processing circuitry 1203 may determine that the PT-RS is present on every fourth resource block The processing circuitry 1203 may determine that the PT-RS is present in every Mth resource block. In block 1514, the processing circuitry 1203 may, responsive to determining that PT-RS is present in every Mth resource block where M is greater than N, set M to be equal to size N. For example, when PRG size is 2 (i.e., the size N is 2) for multi-TRP FDM schemes 2a/2b, the following are the only valid possibilities: PT-RS is not present or PT-RS is present on every second PRB. If the processing circuitry 1203 determines that the PT-RS is present in every fourth block (e.g., is present on every fourth PRB) when the PRG size is 2, then the processing circuitry 1203 resets M to be 2 such that the PT-RS is present on every second PRB.

Various operations from the flow chart of FIG. 17 may be optional with respect to some embodiments of wireless devices and related methods. Regarding methods of example embodiments 1, 12, 14, 16, and 18 (set forth below), for example, operations of blocks 1504, 1506, 1510, and 1514 of FIG. 17 may be optional.

Operations of a RAN node 1300 (implemented using the structure of FIG. 13) will now be discussed with reference to the flow chart of FIG. 18 according to some embodiments of inventive concepts. For example, modules may be stored in memory 1305 of FIG. 13, and these modules may provide instructions so that when the instructions of a module are executed by respective RAN node processing circuitry 1303, processing circuitry 1303 performs respective operations of the flow chart.

In block 1600, the processing circuitry 1303 may determine a transmission scheme to transmit data to a communication device. In block 1602, responsive to the transmission scheme being a scheme 2b where two transmission configuration indicator, TCI, states are used, the processing circuitry 1303 may transmit, via network interface 1307 and/or transceiver 1301 to the communication device, information including a TCI state, an identification that scheme 2b is being used, and a number of resource blocks for the TCI state.

In block 1604, responsive to the transmission scheme being the scheme 2b, the processing circuitry 1303 may transmit a first set of threshold values to the communication device. The communication device may use the first set of threshold values in determining the inverse frequency intensity.

In block 1606, responsive to the transmission scheme being a scheme 2a, may transmit, via network interface 1307 and/or transceiver 1301 to the communication device, information including an identification that scheme 2a is being used, and a number of resource blocks for the scheme 2a.

In block 1608, responsive to the transmission scheme being a normal scheme, the processing circuitry 1303 may transmit a second set of threshold values to the communication device. This allows the RAN node to use a different set of threshold values for scheme 2b than for normal operation.

Figure 18:
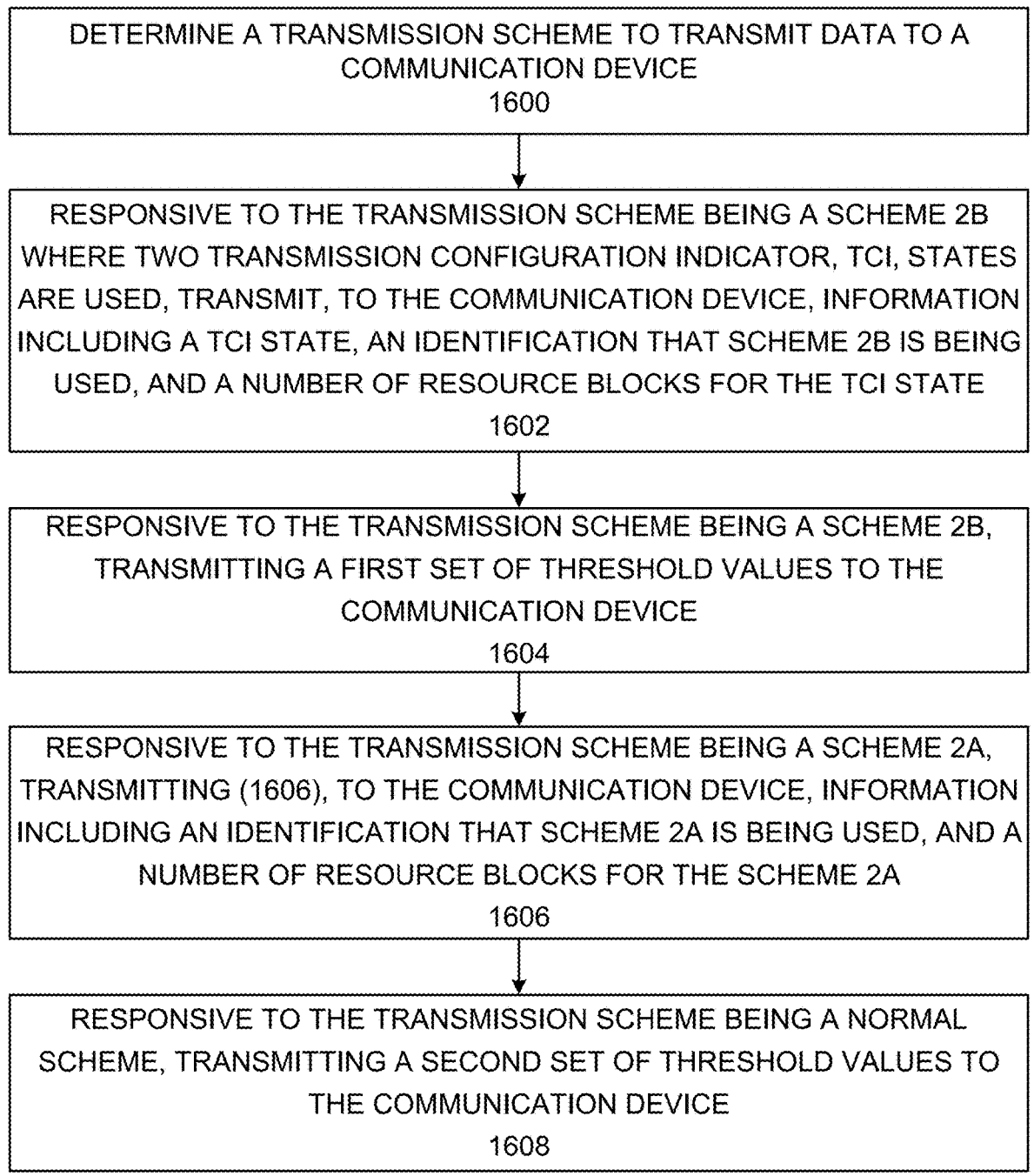
FIG. 18 is a flow chart illustrating operations of a RAN node according to some embodiments of inventive concepts.

Various operations from the flow chart of FIG. 18 may be optional with respect to some embodiments of RAN nodes and related methods. Regarding methods of example embodiments 20, 22, 24, 26, and 28 (set forth below), for example, operations of blocks 1604 and 1608 of FIG. 18 may be optional.

Example embodiments are discussed below.

1. A method in a communication device for determining resource blocks where phase tracking reference signals, PT-RS, resource elements are present in a communication network, the method comprising:
   receiving (1500) information including a transmission scheme;
   responsive to the transmission scheme being a scheme receiving two physical downlink data channel, PDSCH, simultaneously in different frequency resources, where each PDSCH is associated with a transmission configuration indicator, TCI, state specified in the information (1502):
      for each PDSCH:
         determining (1508) an inverse frequency density based on a number of scheduled resource blocks specified in the information; and
         based on the inverse frequency density, determining (1512) which resource blocks a subcarrier containing PT-RS resource elements are present.
2. The method of Embodiment 1 wherein determining the inverse frequency density based on the number of scheduled resource blocks comprises determining the inverse frequency density based on half of the number of scheduled resource blocks.
3. The method of Embodiment 1 wherein determining the inverse frequency density based on the number of scheduled resource blocks comprises determining the inverse frequency density based on a third of the number of scheduled resource blocks.
4. The method of any of Embodiments 1-3 wherein determining the inverse frequency density comprises comparing a modification of the number of scheduled resource blocks to threshold values to determine the inverse frequency density.
5. The method of Embodiments 1-4 wherein determining the inverse frequency density based on the number of scheduled resource blocks comprises determining the inverse frequency density based on a subset of the scheduled resource blocks that are associated to one of two TCI states.
6. The method of any of Embodiments 1-5, further comprising
   receiving (1504) an indication of a set of threshold values from a plurality of sets of threshold values to use in determining the inverse frequency density.
7. The method of any of Embodiment 6 wherein determining the inverse frequency density based on the number of scheduled resource blocks comprises
   comparing the number of scheduled resource blocks to the set of threshold values;
   responsive to the number of scheduled resource blocks being above a first threshold number of the set of threshold values and below a second threshold number of the set of threshold values, determining that the PT-RS is present on every second resource block; and
   responsive to the number of scheduled resource blocks being above the first threshold number of the set of threshold values and above the second threshold number of the set of threshold values, determining that the PT-RS is present on every fourth resource block.
8. The method of any of Embodiments 6-7 wherein receiving the indication of the set of threshold values comprises:
   receiving a first set of threshold values of the plurality of sets of threshold values responsive to the transmission scheme being the scheme 2b; and
   receiving a second set of threshold values of the plurality of sets of threshold values responsive to the transmission scheme being other than the scheme 2b
9. The method of any of Embodiments 1-6 further comprising:
   responsive to the transmission scheme being a scheme 2a, modifying (1510) the inverse frequency density relative to the inverse frequency density determined to increase a number of PT-RS samples across frequency in the scheduled resources.
10. The method of any of Embodiments 1-9, further comprising:
    dividing (1506) a scheduled bandwidth into odd and even groups of adjacent resource blocks to form odd precoding resource block groups, PRGs, of size N and even PRGs of size N.
11. The method of any of Embodiments 1-10, further comprising:
    responsive to determining that PT-RS is present in every Mth resource block where M is greater than N, setting (1514) M to be equal to size N.
12. A communications device (1200) comprising:
    processing circuitry (1203); and
    memory (1205) coupled with the processing circuitry, wherein the memory includes instructions that when executed by the processing circuitry causes the communication device to perform operations comprising:
       receiving (1500) information including a transmission scheme;
       responsive to the transmission scheme being a scheme receiving two physical downlink data channel, PDSCH, simultaneously in different frequency resources, where each PDSCH is associated with a transmission configuration indicator, TCI, state specified in the information (1502):
          for each PDSCH:
             determining (1508) an inverse frequency density based on a number of scheduled resource blocks specified in the information; and based on the inverse frequency density, determining (1512) which resource blocks a subcarrier containing PT-RS resource elements are present.
13. The communication device (1200) of Embodiment 12, wherein the memory includes instructions that when executed by the processing circuitry causes the communication device to perform operations according to any of Embodiments 2-11.
14. A communication device (1200) adapted to perform operations comprising:
   receiving (1500) information including a transmission scheme;
   responsive to the transmission scheme being a scheme receiving two physical downlink data channel, PDSCH, simultaneously in different frequency resources, where each PDSCH is associated with a transmission configuration indicator, TCI, state specified in the information (1502):
      for each PDSCH:
         determining (1508) an inverse frequency density based on a number of scheduled resource blocks specified in the information; and
         based on the inverse frequency density, determining (1512) which resource blocks a subcarrier containing PT-RS resource elements are present.
15. The communication device (1200) of Embodiment 14 adapted to perform according to any of Embodiments 2-11.
16. A computer program comprising program code to be executed by processing circuitry (1203) of a communication device (1200), whereby execution of the program code causes the communication device (1200) to perform operations comprising:
   receiving (1500) information including a transmission scheme;
   responsive to the transmission scheme being a scheme receiving two physical downlink data channel, PDSCH, simultaneously in different frequency resources, where each PDSCH is associated with a transmission configuration indicator, TCI, state specified in the information (1502):
      for each PDSCH:
         determining (1508) an inverse frequency density based on a number of scheduled resource blocks specified in the information; and
         based on the inverse frequency density, determining (1512) which resource blocks a subcarrier containing PT-RS resource elements are present.
17. The computer program of Embodiment 16 whereby execution of the program code causes the communication device (1200) to perform operations according to any of Embodiments 2-11.
18. A computer program product comprising a non-transitory storage medium including program code to be executed by processing circuitry (1203) of a communication device (1200), whereby execution of the program code causes the communication device (1200) to perform operations comprising:
   receiving (1500) information including a transmission scheme;
   responsive to the transmission scheme being a scheme receiving two physical downlink data channel, PDSCH, simultaneously in different frequency resources, where each PDSCH is associated with a transmission configuration indicator, TCI, state specified in the information (1502):
      for each PDSCH:
         determining (1508) an inverse frequency density based on a number of scheduled resource blocks specified in the information; and
         based on the inverse frequency density, determining (1512) which resource blocks a subcarrier containing PT-RS resource elements are present.
19. The computer program product of Embodiment 18 whereby execution of the program code causes the communication device (1200) to perform operations according to any of embodiments 2-11.
20. A method of operating a radio access network node, RAN, (1300) in a communication network, the method comprising:
   determining (1600) a transmission scheme to transmit data to a communication device;
   responsive to the transmission scheme being a scheme 2b where two transmission configuration indicator, TCI, states are used, transmitting (1602), to the communication device, information including a TCI state, an identification that scheme 2b is being used, and a number of resource blocks for the TCI state; and
   responsive to the transmission scheme being a scheme 2a, transmitting (1606), to the communication device, information including an identification that scheme 2a is being used, and a number of resource blocks for the scheme 2a.
21. The method of Embodiment 19, further comprising:
   responsive to the transmission scheme being the scheme 2b, transmitting (1604) a first set of threshold values to the communication device; and
   responsive to the transmission scheme being a normal scheme, transmitting (1608) a second set of threshold values to the communication device.
22. A radio access network, RAN, node (1300) comprising:
   processing circuitry (1303); and
   memory (1305) coupled with the processing circuitry, wherein the memory includes instructions that when executed by the processing circuitry causes the RAN node to perform operations comprising:
   determining (1600) a transmission scheme to transmit data to a communication device;
   responsive to the transmission scheme being a scheme 2b where two transmission configuration indicator, TCI, states are used, transmitting (1602), to the communication device, information including a TCI state, an identification that scheme 2b is being used, and a number of resource blocks for the TCI state; and
   responsive to the transmission scheme being a scheme 2a, transmitting (1604), to the communication device, information including an identification that scheme 2a is being used, and a number of resource blocks for the scheme 2a.
23. The RAN node of Embodiment 22 wherein the memory includes further instructions that when executed by the processing circuitry causes the RAN node to perform operations according to Embodiment 21.

24. A radio access network, RAN, node (1300) adapted to perform operations comprising:
   determining (1600) a transmission scheme to transmit data to a communication device;
   responsive to the transmission scheme being a scheme 2b where two transmission configuration indicator, TCI, states are used, transmitting (1602), to the communication device, information including a TCI state, an identification that scheme 2b is being used, and a number of resource blocks for the TCI state; and
   responsive to the transmission scheme being a scheme 2a, transmitting (1604), to the communication device, information including an identification that scheme 2a is being used, and a number of resource blocks for the scheme 2a.

25. The RAN node (1300) of Embodiment 24 wherein the RAN node is further adapted to perform according to Embodiment 21.

26. A computer program comprising program code to be executed by processing circuitry (1303) of a radio access network, RAN, node (1300), whereby execution of the program code causes the RAN node (1300) to perform operations comprising:
   determining (1600) a transmission scheme to transmit data to a communication device;
   responsive to the transmission scheme being a scheme 2b where two transmission configuration indicator, TCI, states are used, transmitting (1602), to the communication device, information including a TCI state, an identification that scheme 2b is being used, and a number of resource blocks for the TCI state; and
   responsive to the transmission scheme being a scheme 2a, transmitting (1604), to the communication device, information including an identification that scheme 2a is being used, and a number of resource blocks for the scheme 2a.

27. The computer program of Embodiment 26 whereby execution of the program code causes the RAN node (1300) to perform further operations according to embodiment 21.

28. A computer program product comprising a non-transitory storage medium including program code to be executed by processing circuitry (1303) of a radio access network, RAN, node (1300), whereby execution of the program code causes the RAN node (1300) to perform operations comprising:
   determining (1600) a transmission scheme to transmit data to a communication device;
   responsive to the transmission scheme being a scheme 2b where two transmission configuration indicator, TCI, states are used, transmitting (1602), to the communication device, information including a TCI state, an identification that scheme 2b is being used, and a number of resource blocks for the TCI state; and
   responsive to the transmission scheme being a scheme 2a, transmitting (1604), to the communication device, information including an identification that scheme 2a is being used, and a number of resource blocks for the scheme 2a.

29. The computer program product of Embodiment 28 whereby execution of the program code causes the RAN node (1300) to perform operations according to embodiment 21.

Explanations are provided below for various abbreviations/acronyms used in the present disclosure.

| Abbreviation | Explanation |
| --- | --- |
| SCS | subcarrier spacing |
| NR | new radio |
| RB | resource block |
| OFDM | Orthogonal Frequency Division Multiplexing |
| CP | cyclic prefix |
| DFT | discrete Fourier transform |
| PDCCH | physical downlink control channel |
| PDCH | physical data channel |
| PDSCH | physical downlink data channel |
| PUSCH | physical uplink data channel |
| DCI | downlink control information |
| TDRA | time domain resource assignment |
| RRC | radio resource control |
| SLIV | start and length indicator |
| DM-RS | demodulation reference signal |
| TCI | transmission configuration indicator |
| RE | resource element |
| QCL | quasi co-located |
| CSI-RS | channel-state information reference signal |
| PT-RS | phase tracking reference signal |
| TRP | transmission point |
| FDM | frequency division multiplexed |
| PRG | precoding resource block group |

References are identified below.
3GPP TS 38.214 v15.6.0-3rd Generation Partnership Project; Technical Specification Group Radio Access Network; NR; Physical layer procedures for data (Release 15)

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 21:
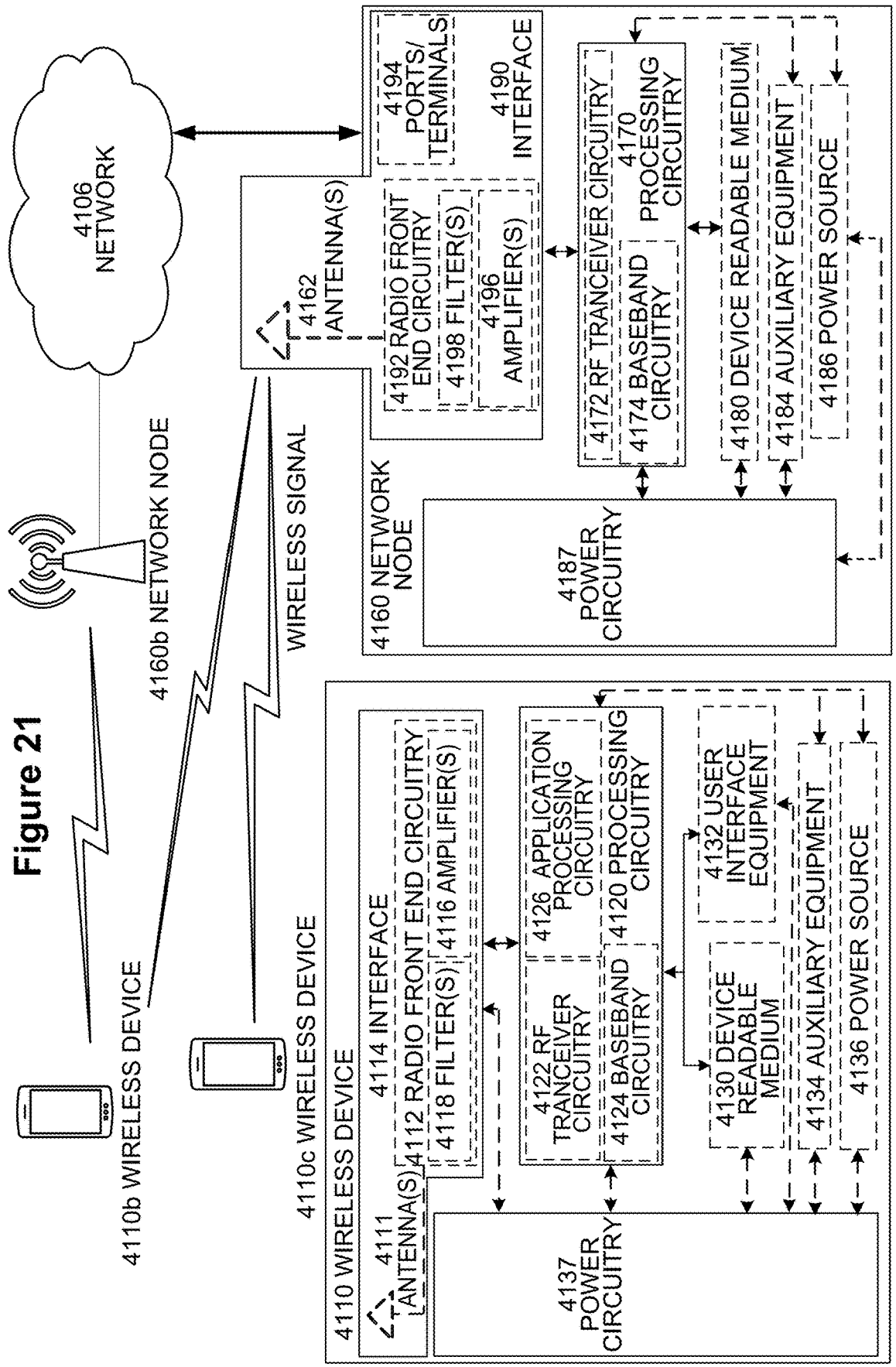
FIG. 21 is a block diagram of a wireless network in accordance with some embodiments.

FIG. 21 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 21. For simplicity, the wireless network of FIG. 21 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 211 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4190 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 21 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4114 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 22:
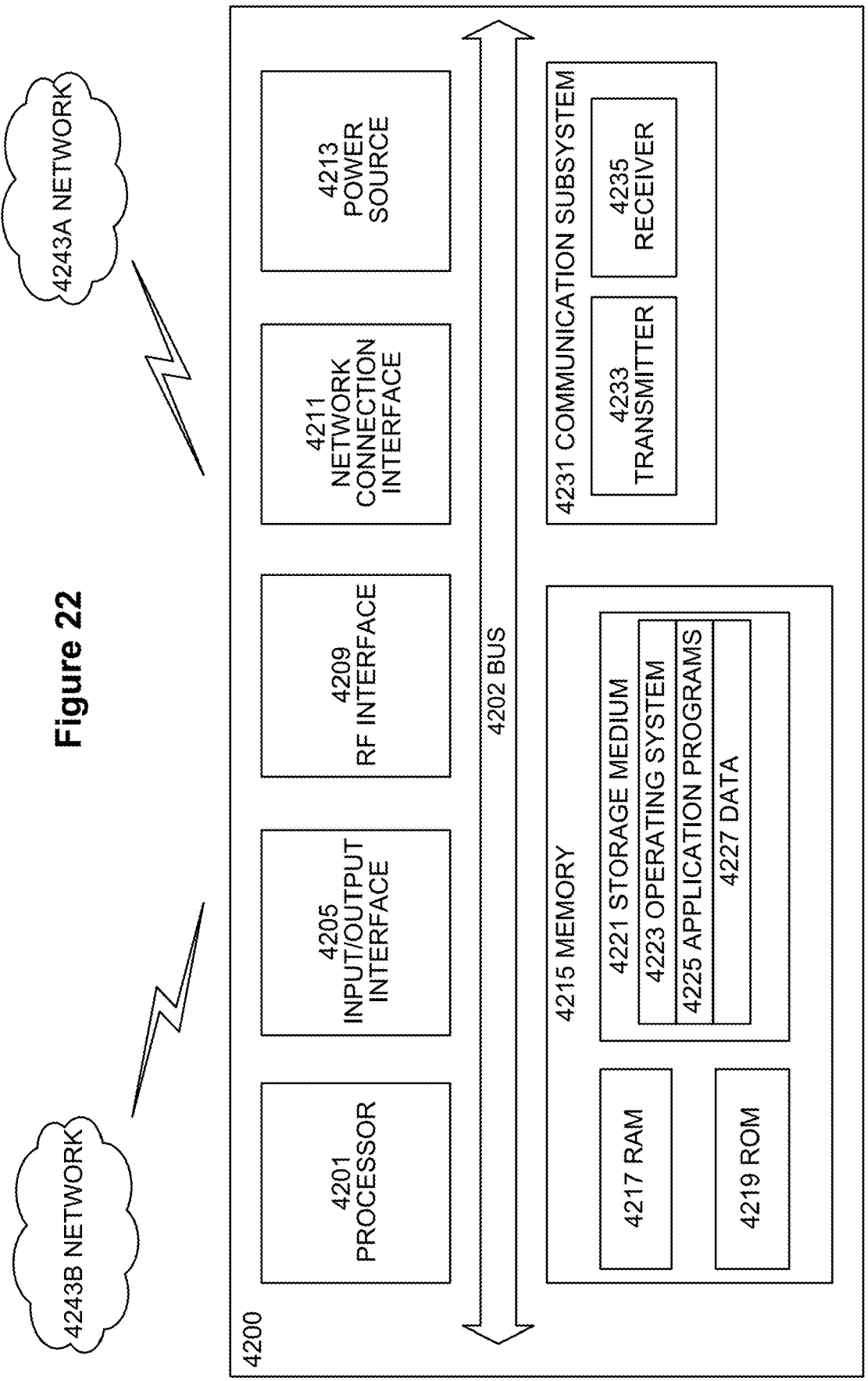
FIG. 22 is a block diagram of a user equipment in accordance with some embodiments

FIG. 22 illustrates a user Equipment in accordance with some embodiments.

FIG. 22 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 22, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 22 is a UE, the components discussed herein are equally applicable to a WD, and vice-versa.

In FIG. 22, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4233, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 22, or only a subset of the components. The level of integration between the components may vary from one UE to another UE. Further, certain UEs may contain multiple instances of a component, such as multiple processors, memories, transceivers, transmitters, receivers, etc.

In FIG. 22, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 22, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 22, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.42, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 23:
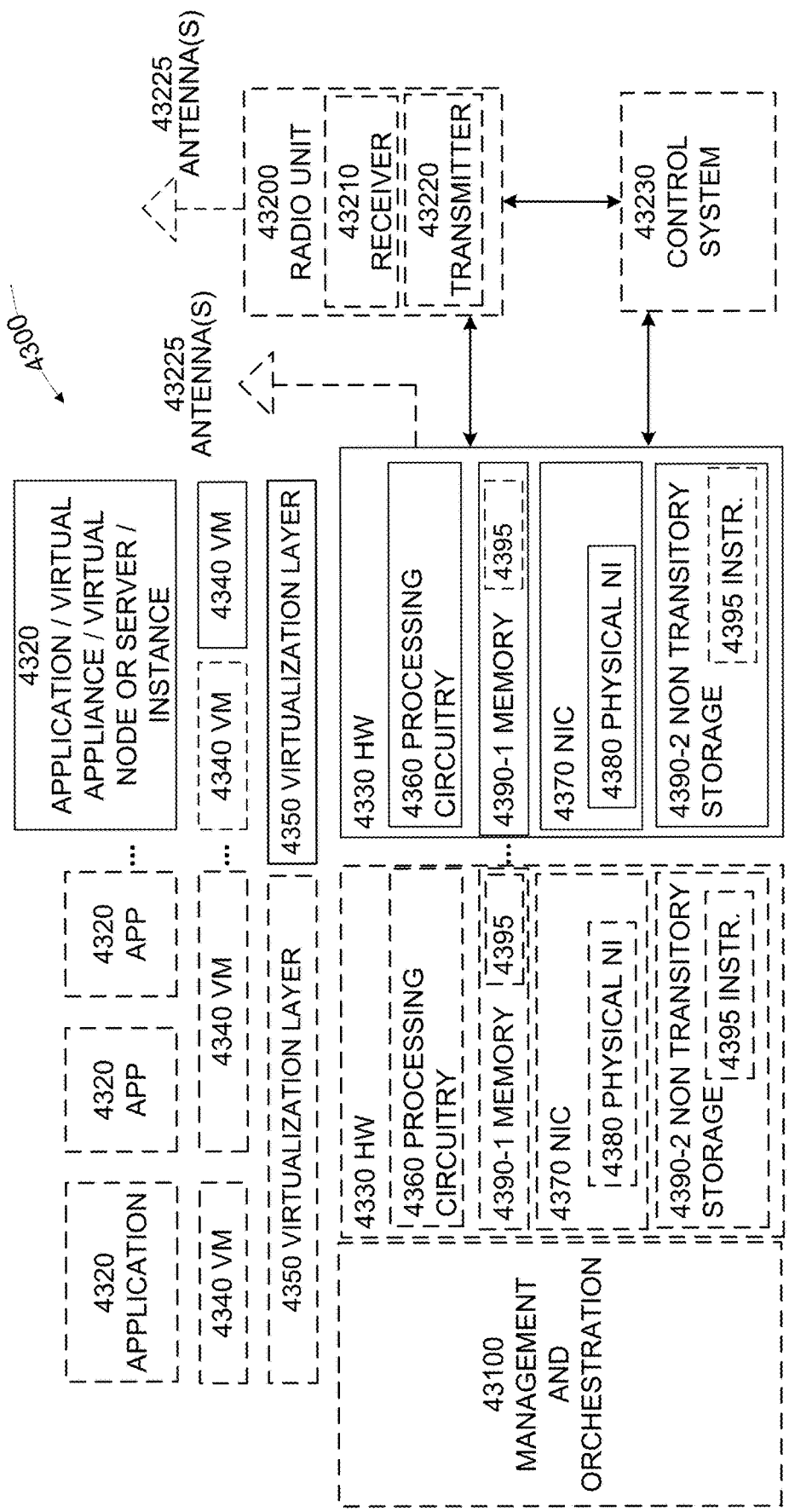
FIG. 23 is a block diagram of a virtualization environment in accordance with some embodiments.

FIG. 23 illustrates a virtualization environment in accordance with some embodiments.

FIG. 23 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340, comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 23, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 23.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 24:
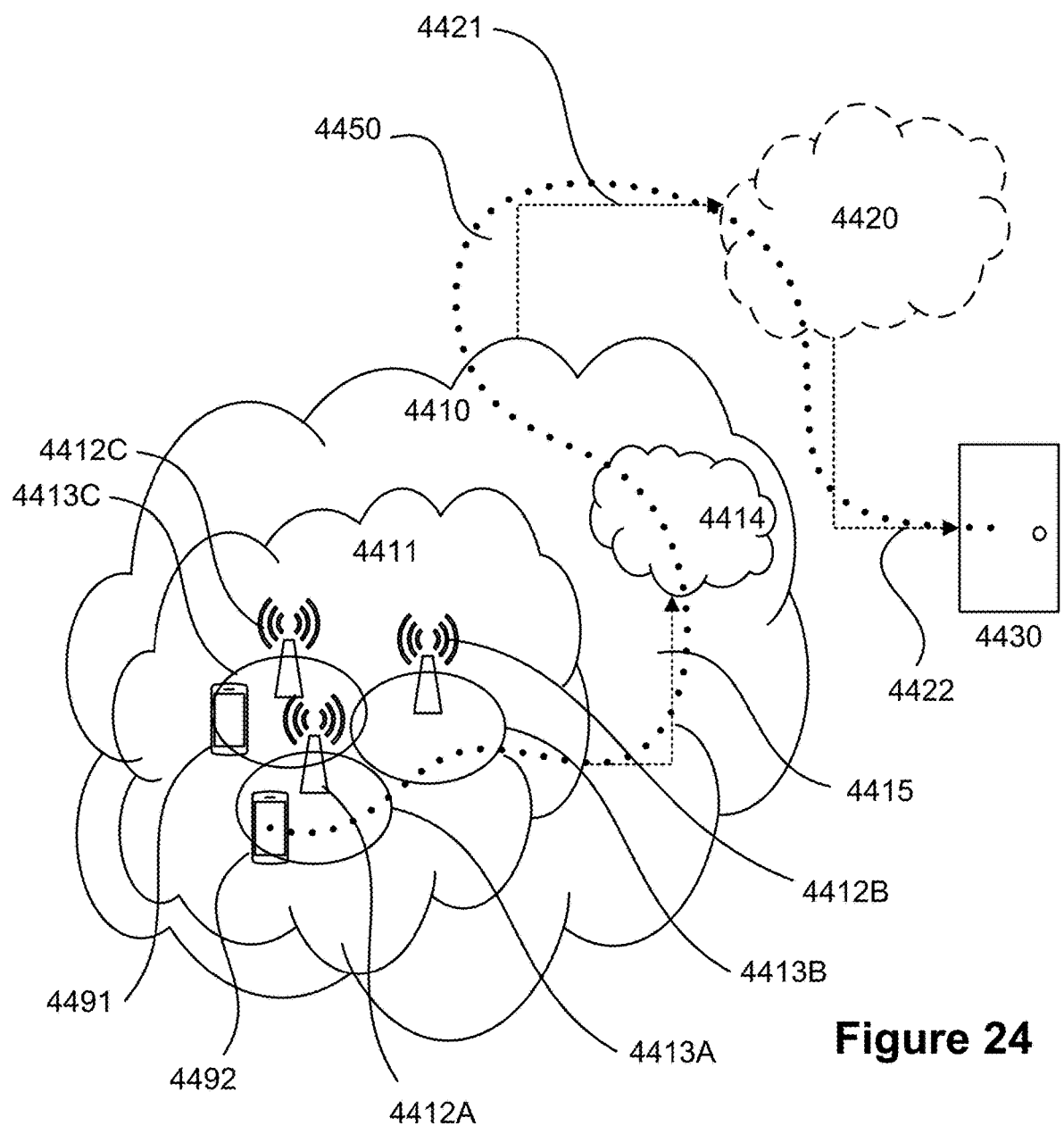
FIG. 24 is a block diagram of a telecommunication network connected via an intermediate network to a host computer in accordance with some embodiments.

FIG. 24 illustrates a telecommunication network connected via an intermediate network to a host computer in accordance with some embodiments.

With reference to FIG. 24, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 24 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 25:
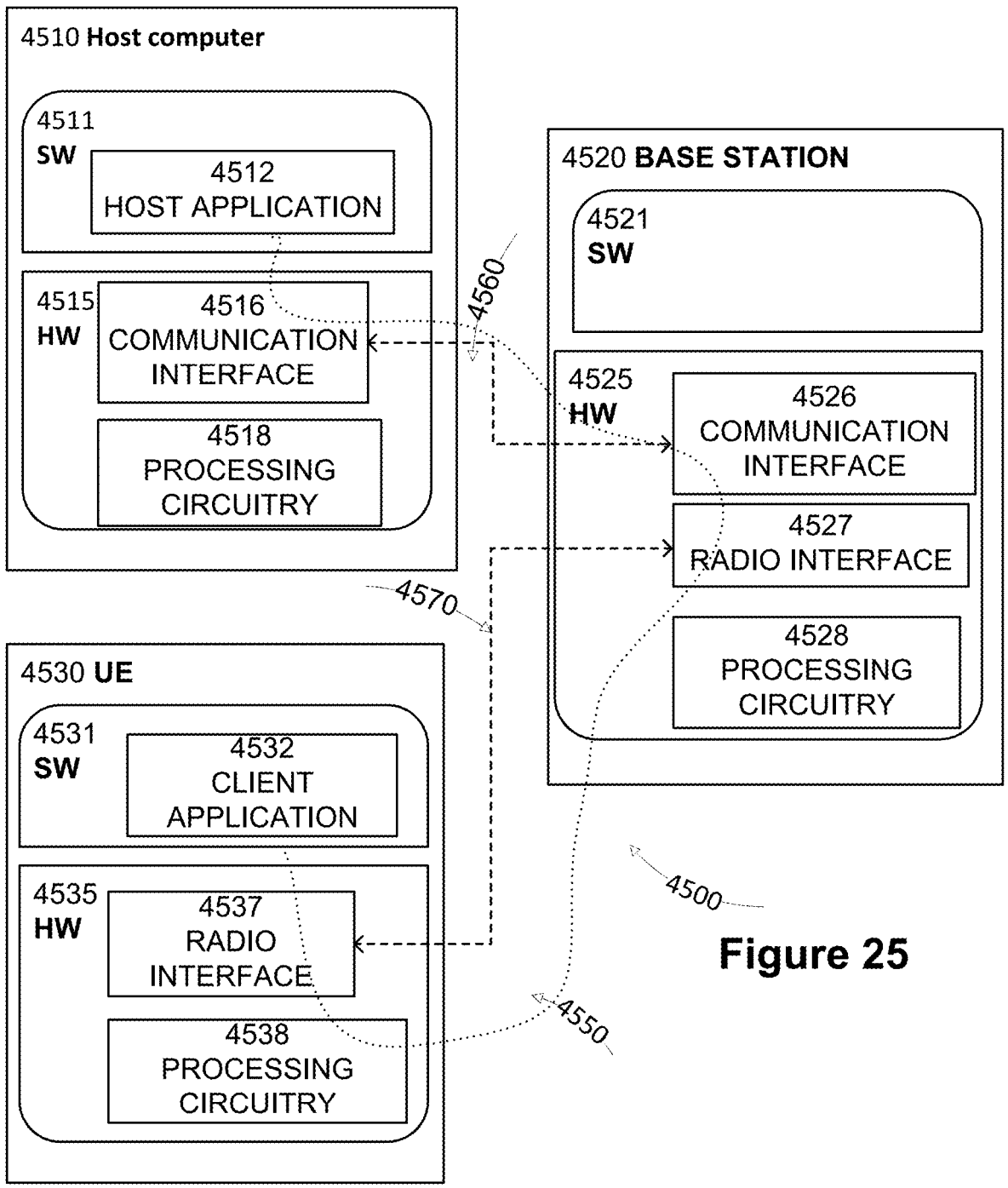
FIG. 25 is a block diagram of a host computer communicating via a base station with a user equipment over a partially wireless connection in accordance with some embodiments.

FIG. 25 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 25. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 45) served by base station 4520. Communication interface 4526 may be configured to facilitate connection 4560 to host computer 4510. Connection 4560 may be direct or it may pass through a core network (not shown in FIG. 45) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 25 may be similar or identical to host computer 4430, one of base stations 4412*a*, 4412*b*, 4412*c* and one of UEs 4491, 4492 of FIG. 24, respectively. This is to say, the inner workings of these entities may be as shown in FIG. 25 and independently, the surrounding network topology may be that of FIG. 24.

In FIG. 25, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figures 26, 27:
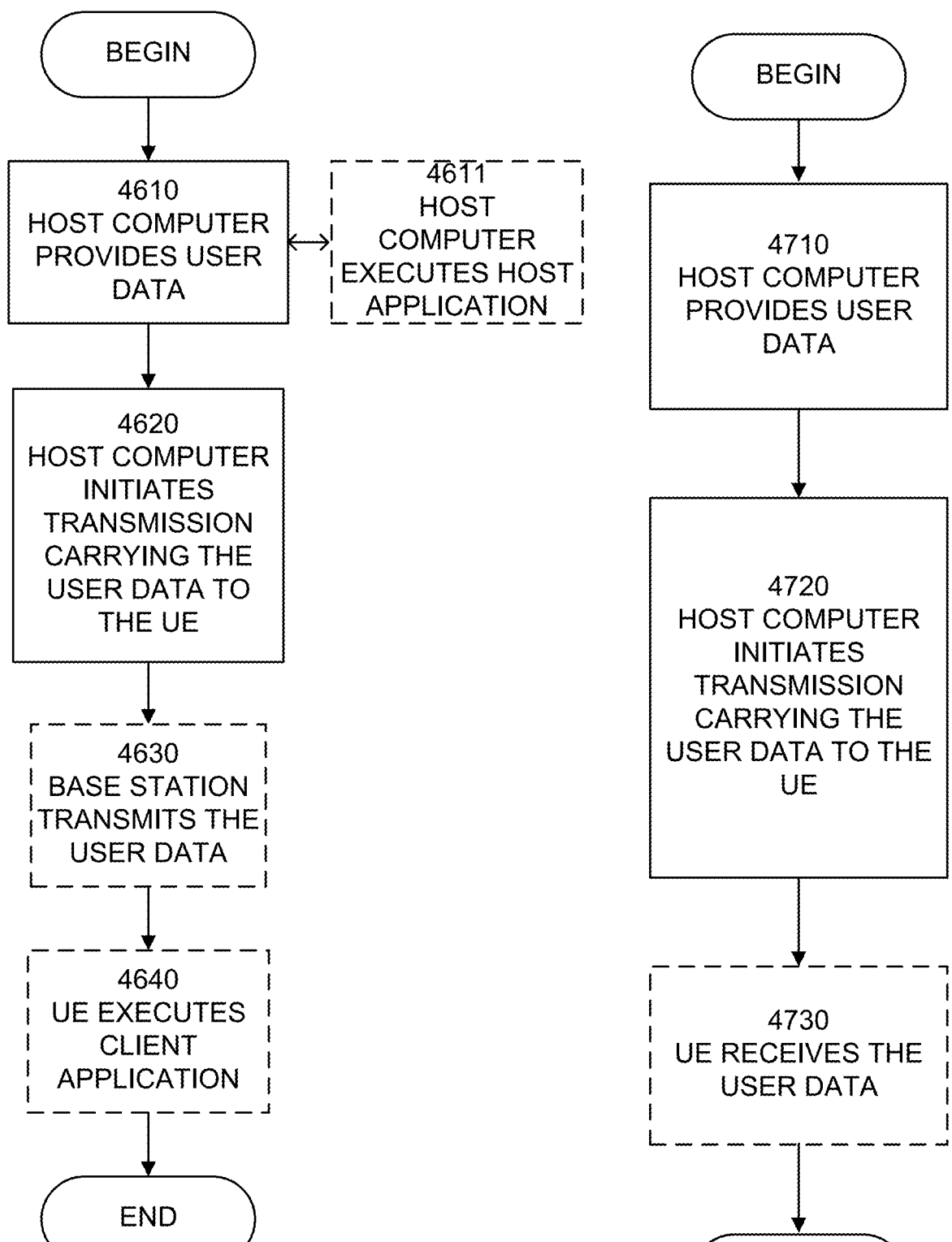
FIG. 26 is a block diagram of methods implemented in a communication system including a host computer, a base station and a user equipment in accordance with some embodiments.
FIG. 27 is a block diagram of methods implemented in a communication system including a host computer, a base station and a user equipment in accordance with some embodiments.

FIG. 26 illustrates methods implemented in a communication system including a host computer, a base station and a user equipment in accordance with some embodiments FIG. 26 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 26 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 27 illustrates methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 27 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 28 illustrates methods implemented in a communication system including a host computer, a base station and a user equipment in accordance with some embodiments FIG. 28 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 28 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 29 illustrates methods implemented in a communication system including a host computer, a base station and a user equipment in accordance with some embodiments FIG. 29 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 29 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
PPS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Appendix 1 is part of this specification.

APPENDIX 1

| | |
|---|---|
| 3GPP TSG-RAN WG1 Meeting #99 | Tdoc R1-19xxxxx |
| Reno, USA, Nov. 18$^{th}$-22$^{nd}$, 2019 | |
| Agenda Item: | 7.2.8.2 |
| Source: | Ericsson |
| Title: | Finalizing issues for mTRP |
| Document for: | Discussion, Decision |

1 Introduction

This contribution discusses remaining issues for multi-TRP/multi-panel (mTRP) operation in NR Rel-16.

2 Remaining Issues for Single Pdcch Based Multi-Trp Scheduling 2.1 LTE CRS Rate Matching Proposal 1 For single PDCCH case, if two overlapping LTE CRS patterns are configured, the UE shall rate match PDSCH around both LTE CRS, for all received layers.

2.1 Default TCI State

An open issue is related to K1 value and which TCI state to apply. When K1 is smaller than the threshold, what is the default TCI state? From our understanding, the threshold was introduced to allow a UE in FR2 to possibly use a known wide Rx beam for PDSCH reception if the UE doesn't have enough time to switch to a beam indicated by the TCI. In case of Multi-TRP, a UE would be indicated with 2 TCI states, corresponding to 2 Rx beams. The main use case of indicating a K1 value below the threshold would be for fast PDSCH scheduling over the PDCCH beam such that the UE can receive it without beam switching. Therefore, we have the following proposal:

Proposal 2 When 2 TCI states are indicated in DCI and the K1 value in the same DCI is below the threshold, the default TCI states are the TCI states indicated in the DCI or TCIs associated to 2 CORESETs.

2.2 Combination of 2 TCI States and 1 or 3 CDM Groups

A remaining open issue is how the UE shall handle the case of 2 indicated TCI states and 3 CDM groups. Our preferred resolution is the following:

Proposal 3 If a TCI codepoint indicates two TCI states and indicated DMRS ports are from single CDM group, and if repetition scheme is not enabled (i.e. URLLC based scheme not enabled), then the UE applies the first TCI state and ignores the second TCI state in the codepoint. And in the case of 3 CDM groups:

Proposal 4 If a TCI codepoint indicates two TCI states and indicated DMRS ports are from three CDM groups, then the UE associates the first TCI state to the first CDM group ($\lambda=0$) and the second TCI states to the second and third CDM group ($\lambda=1, 2$).

2.3 PT-RS Port to DM-RS Port Association for Rank 5 and 6

In Rel.15 downlink PT-RS procedures, in case of two CW is scheduled to be transmitted (rank 5 or 6), the PT-RS port is associated to the DM-RS port that belongs to the CW with the highest MCS. This increases the probability that the SNR for the layer that PT-RS is associated with has a high SNR and as evaluations have shown during Rel.15, this improves phase tracking performance and throughput.

In the previous meeting, it was agreed for the case of two PT-RS ports, the first/second PTRS port is associated with the lowest indexed DMRS port within the DMRS ports corresponding to the first/second indicated TCI state, respectively. However, this agreement implies that for 2 CW transmission, the PT-RS ports may in some cases be mapped to the layer with the worst SNR.

Therefore, we propose the following for rank 5 and 6 case:

Proposal 5 If a UE is scheduled with two codewords and two PTRS ports is configured for single-PDCCH based multi-TRP/Panel transmission at least for eMBB and URLLC scheme 1a, and if two TCI states are indicated by one TCI code point, and for each TCI state
➔ if the TCI state is associated to two MCSs (i.e. the TCI state is associated with two code words) then the first PTRS port is associated with the lowest indexed DMRS port assigned for the codeword with the higher MCS within the DMRS ports corresponding to the TCI state, and
➔ if the MCS indices of the two codewords are the same, then the first/second PTRS port is associated with the lowest indexed DMRS port within the DMRS ports corresponding to the first/second indicated TCI state We provide an example on how this proposal affects the association rule: For Type 1 DMRS, ports 0, 1, 4, 5 belong to first CDM group (first TCI state) and ports 2, 3, 6, 7 belong to second CDM group (second TCI state). Assume rank 5 scheduling where ports 0-4 are used, then according to CW2L mapping, CW0 use port 0, 1 and CW1 use port 2, 3, 4. This leads to the following cases:

If MCS is higher for CW0 compared to CW1, then port 0 and port 2 are associated with PT-RS for the $1^{st}$ TCI state and $2^{nd}$ TCI state, respectively.

If MCS is higher for CW1 compared to CW0, then port 4 and port 2 are associated with PT-RS for the $1^{st}$ TCI state and $2^{nd}$ TCI state, respectively.

If MCS is same for CW1 and CW0, then port 0 and port 2 are associated with PT-RS for the $1^{st}$ TCI state and $2^{nd}$ TCI state, respectively.

2.4 the Case of Single CDM Group, 2 TCI States and 2 PT-RS Ports

Furthermore, we propose the following fallback in case of 2 PT-RS ports, 2 TCI states are configured but a single CDM group is used for the PDSCH.

Proposal 6 If a TCI codepoint indicates two TCI states and indicated DMRS ports are from single CDM group, and if two PT-RS ports are enabled, then a single PT-RS port is transmitted.

3 Reliability/Robustness Specific Extensions for PDSCH

3.1 Remaining Issues for FDM Schemes

3.1.1 on the Issue of Two PTRS Ports for Scheme 2A/2B

In Scheme 2a and 2b, each PRG is utilized for transmission by one of the two TRP only. Also, the DM-RS ports are from one CDM group only according to agreement with a comb-based frequency allocation transmission, divided into odd and even PRGs (except in the case of wideband PRG, in which case two continuous chunks or RBs are used per TRP). The same DM-RS port number(s) is used in the odd and even PRGs, hence there is no need to configure two PT-RS ports in scheme 2a and 2b.

Proposal 7 In Scheme 2a and 2b, a single PT-RS port is used. If two PT-RS ports have been configured (in case dynamic switching between schemes is supported), then only the PT-RS port associated with the lowest index DM-RS port is transmitted.

The network may transmit the PT-RS port from each of the two TRPs respectively. It may in some cases be so that phase noise contributions come also from the transmitter side, i.e. gNB. This is particularly the case if lower complexity gNBs are used, which doesn't have the same local oscillator stability as advanced macro gNBs. Hence, the UE may not jointly use PT-RS transmissions from PRGs that are transmitted from different TRPs, as they may have very different phase noise characteristics. Hence, we propose:

Proposal 8 In scheme 2a, the UE shall not assume that it can use the PT-RS transmissions from PDSCH resources associated with different TCI states in a joint manner, when using PT-RS for tracking the phase. Hence, phase tracking needs to be estimated for each of the two groups of PDSCH resources separately.

For Scheme 2b on the other hand, the procedure is simpler, as there are two CW transmitted, and thus two PDSCHs transmitted. A simple rule is then the following:

Proposal 9 In scheme 2b, the PT-RS resource element mapping is established for each of the two PDSCHs independently (i.e. to the scheduled resources of the PDSCH). The UE shall not use PT-RS of one PDSCH as the PT-RS for the other PDSCH.

Moreover, in scheme 2b, the actual number of RB used for transmission from one TRP, i.e. per PDSCH, is roughly 50% of the total number of scheduled RB since the resource allocation indicates the total resources used for both PDSCH. Hence, to correctly assign the frequency density $K_{PT-RS}$ of the PT-RS for each PDSCH, only 50% of the total scheduled bandwidth should be assumed per PDSCH. Hence, Proposal 10 In scheme 2b, the value used for the bandwidth $N_{RB}$ when determining $K_{PT-RS}$ from Table 5.1.6.3-2 in TS 38.214 is ceil(X/2) where X is the total number of scheduled resource blocks in the scheme 2b resource allocation.

3.1.2 RV Sequence for Scheme 2B

For Scheme 2b, agreement last meeting was:
Agreement
For single-DCI based M-TRP URLLC scheme 2b
  For a RV sequence to be applied to RBs associated with two TCI states sequentially,
    $RV_{id}$ indicated by the DCI is used to select one out of four RV sequence candidates, whereas sequences are predefined in spec (FFS exact sequences)

Based on simulation results provided in the previous meetings, e.g., [6], it seems that at least (RV1,RV2)=(0,2) and (0,0) should be supported. (0,0) can be used in case of blocking while (0,2) can be used when there is no blocking. This is because RV0 is self-decodable while RV2 isn't. Thus, when one of the TRPs has the risk of being completely blocked, it is better to transmit RV0 from both TRPs, so that at a self-decodable RV can be received. However, when the TRPs are experiencing fading dips rather than blocking, it is better to transmit different RVs to achieve incremental redundancy rather than chase combining and (RV1,RV2)= (0,2) was shown to be the best combination.

Additionally, (2,2) and (1,3) may be included to support retransmission. For example, (2,2) may be used for retransmission when (0,0) was used in the initial transmission to have (0,2) for each TRP in case one TRP is blocked. Similarly, (1,3) may be used for retransmission when (0,2) was used in the initial transmission to have a combined RV sequence of (0, 2, 3, 1) over two transmissions to maximize soft combining gain. The resulted 4 RV sequences are shown in Table 1.

Proposal 11 For Scheme 2b, use the 4 RV sequences listed in Table 1.

TABLE 1

An example of RV configuration for Scheme 2b

| RV field in DCI | RV1 | RV2 |
|---|---|---|
| 0 | 0 | 0 |
| 1 | 2 | 2 |
| 2 | 0 | 2 |
| 3 | 1 | 3 |

3.2 Remaining Issues for TDM Schemes

3.2.1 Repetition Indication for Scheme 3

In RAN1 #98bis, the following was agreed for scheme 3.
Agreement
For single-DCI based M-TRP URLLC scheme 3, the starting symbol of the second transmission occasion has K symbol offset relative to the last symbol of the first transmission occasion, whereas the value of K can be optionally configured by RRC. If not configured, K=0.
  The starting symbol and length of the first transmission occasion is indicated by SLIV.
  The length of the second transmission occasion is the same with the first transmission occasion.
  Exact candidate value of K can be decided in RAN1 #99
  FFS: Any restrictions on the possible value pairs for K and SLIV In NR Rel-15, the starting symbol (S) and length (L) are jointly encoded as specified in clause 5.1.2.1 of TS 38.214 such that the time domain resource allocation does not cross the slot boundary. This means there is a constraint $0<L\leq14-S$ that must be met in NR Rel-15.

As already agreed in RAN1 #98bis, for scheme 3, the number of transmission occasions is two when a codepoint of the TCI field indicates two TCI states. Hence, the constraint related to SLIV should be modified taking into account the higher layer configured value of K. An appropriate constraint for the case when there is two transmission occasions is $0<2L\leq14-S-K$. This constraint ensures that the time domain resource allocation for the two transmission occasions does not cross the slot boundary.

Furthermore, in the email discussion [98b-NR-22] related to the Rel-16 NR eURLLC work item, the following agreement was made:
Agreement
For time domain resource allocation indication for PDSCH for Rel-16 URLLC in new DCI format, using the starting symbol of the PDCCH monitoring occasion in which the DL assignment is detected as the reference of the SLIV is supported.
  A RRC parameter is used to enable the utilization of the new reference
  When the RRC parameter enables the utilization of the new reference, the new reference is applied for TDRA entries with K0=0
  FFS: Other entries with K0>0 can also be included in the same TDRA table
  For other entries (if any) in the same TDRA table, the reference is slot boundary as in Rel-15.

In NR Rel-15, the starting symbol S is relative to the start of the slot (i.e., reference point is the start of the slot). However, according to the above eURLLC agreement, the starting symbol S is relative to the starting symbol of the PDCCH monitoring occasion in which the DL assignment is detected. Furthermore, as agreed above, the use of this new reference point is enabled/disabled by a new RRC parameter. It should be noted that when the use of the new reference point is enabled, the restrictions related to SLIV and K will be impacted. An appropriate constraint for this case when there is two transmission occasions is $0<2L\leq14-S-S_0-K$ where $S_0$ denotes the starting symbol of the PDCCH monitoring occasion in which the DL assignment is detected.

Proposal 12 With regards to restrictions on the possible value pairs for K and SLIV for Scheme 3, the following restrictions apply, and if the UE receives K and SLIV values in the scheduling DCI that do not satisfy the conditions below, then the UE can assume that only the first repetition in the slot is transmitted:
  If using the starting symbol of the PDCCH monitoring occasion in which the DL assignment is detected as the reference point for starting symbol S is not enabled, then the restriction 0<2L≤14−S−K applies.

If using the starting symbol of the PDCCH monitoring occasion in which the DL assignment is detected as the reference point for starting symbol S is enabled, then the restriction 0<2L≤14−S−$S_0$−K applies wherein $S_0$ is the starting symbol of the PDCCH monitoring occasion in which the DL assignment is detected.

One of the reasons for introducing a configurable symbol offset K is to allow transmission of scheme 3 in a slot containing both DL and UL symbols. Particularly, the use case for having a non-zero K value is to allow the case where there are UL symbols (and flexible symbols) in between the DL symbols allocated for the first transmission occasion and the DL symbols allocated for the second transmission occasion. Considering Table 11.1.1-1 of TS 38.213, slot formats 46, 47, 49, 50, 53, and 54 offer the possibility of $1^{st}$ transmission occasion in a set of DL symbols and the $2^{nd}$ transmission occasion in another set of DL symbol wherein the two sets of DL symbols are separated by UL/flexible symbols.

Figure 19:
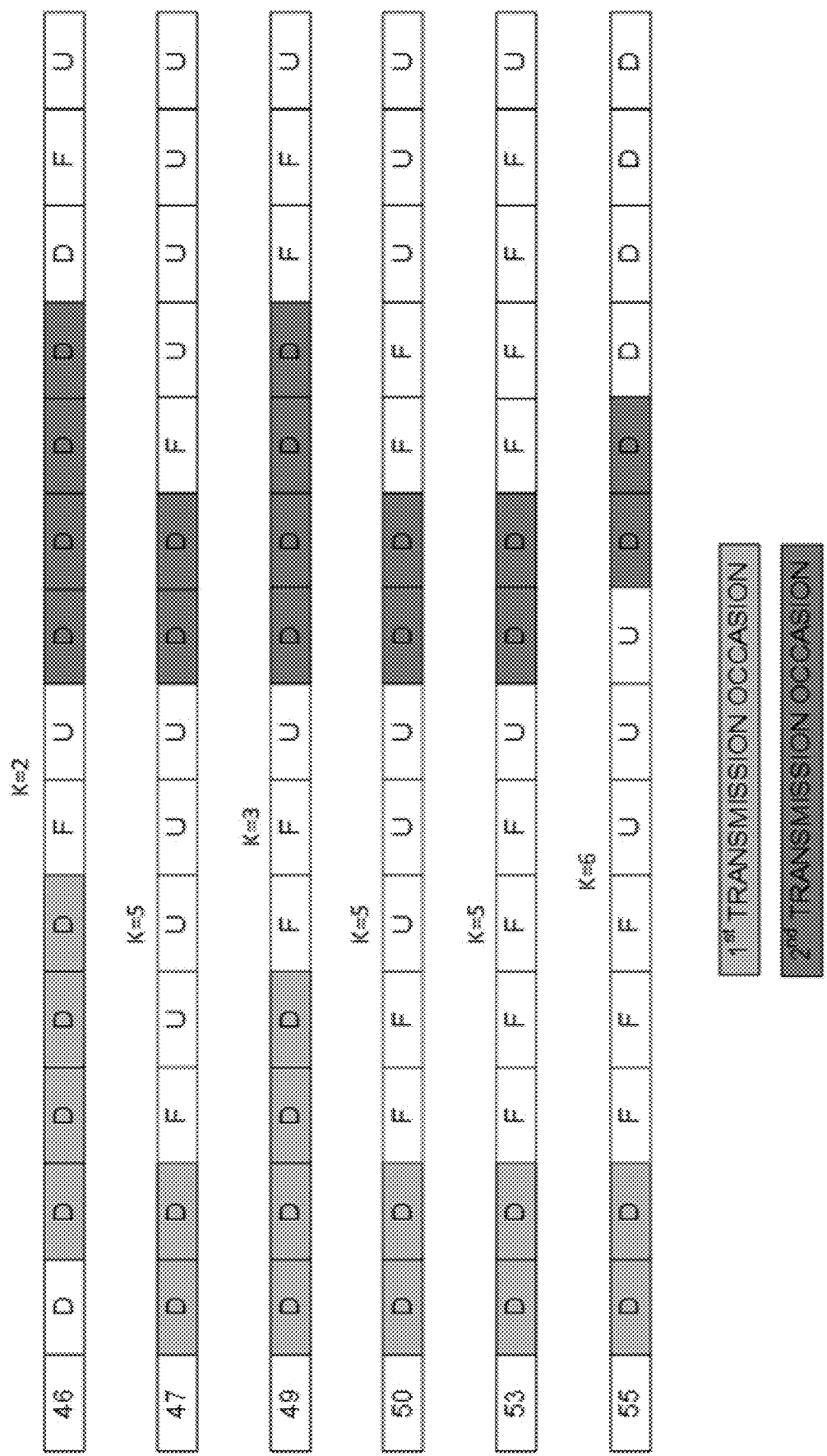
FIG. 19 illustratively shows different K values suitable for different slot formats.

Another motivation is to avoid collisions between PDSCH DMRS and reserved resources such as LTE CRS. FIG. 19 shows an illustration of different K values suitable for different slot formats. As shown in the figure, K values in the range from 0 to 6 are useful. Hence, we propose the following:

Proposal 13 Support a value range from 0 to 6 for the configurable symbol offset K.

It should be noted that a single configured value of K is not suitable for different slot formats particularly in the case when slot format is dynamically indicated. For instance, a K value of 6 which is suitable for slot format 55 in FIG. 19 is not suitable for slot format 46. Furthermore, the same value of K is not suitable even within the same slot format when different L values are used for scheme 3.

Figure 20:
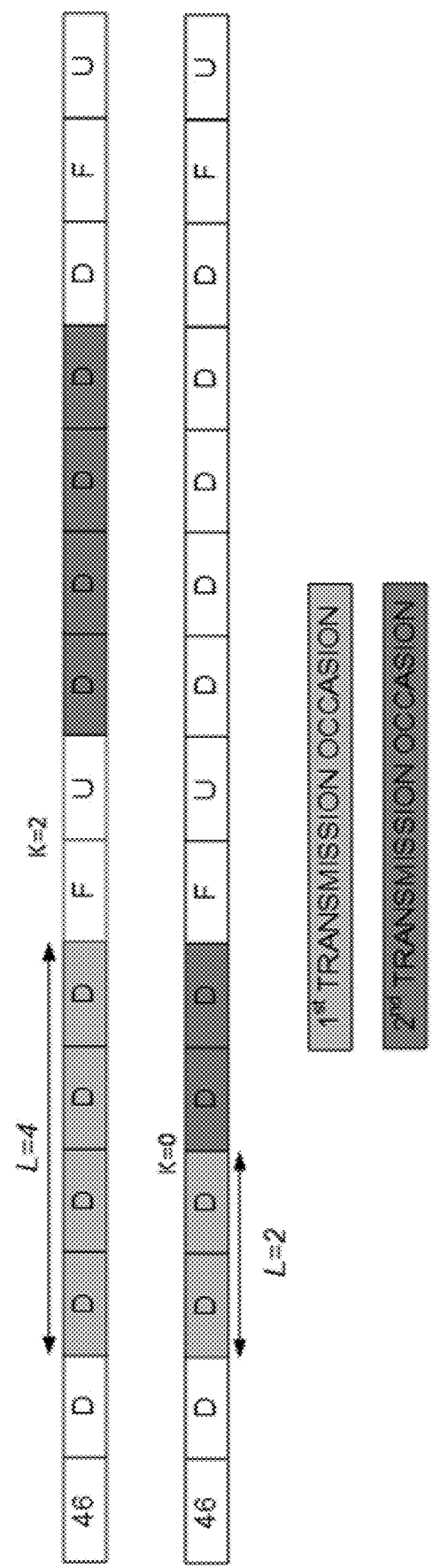
FIG. 20 illustratively shows different K values suitable for the same slot format when different L values are used.

FIG. 20 shows a second illustration when different K values are needed when different L values are used within the same slot format. In the top part of this figure, scheme 3 is used with L=4 which requires a K value of 2. In the bottom part of the figure, scheme 3 is used with L=2 which requires a K value of 0. Hence, to maintain the scheduling flexibility, different values of K should allow to be dependent on the SLIV. Since SLIV is indicated as part of PDSCH-TimeDomainResourceAllocation, we propose to also indicate the K value as part of PDSCH-TimeDomainResourceAllocation.

Proposal 14 In NR Rel-16, the symbol offset K for multi-TRP scheme 3 is configured as part of PDSCH-TimeDomainResourceAllocation.

3.2.2 Repetition Indication for Scheme 4

In RAN1 #98bis, the following was agreed.
Agreement
For single-DCI based M-TRP URLLC schemes, the number of transmission occasions is indicated by following:
  For scheme 3, the number of transmission occasions is implicitly determined by the number of TCI states indicated by a code point whereas one TCI state means one transmission occasion and two states means two transmission occasions.
  For scheme 4, TDRA indication is enhanced to additionally indicate the number of PDSCH transmission occasions by using PDSCH-TimeDomainResourceAllocation field.
  The maximum number of repetition is FFS.

According to Clause 11.1 of TS 38.213, when a UE is scheduled by DCI format 1-1 to receive PDSCH over multiple slots, and if a slot among the multiple slots contains at least one symbol from a set of symbols where the UE is scheduled to receive PDSCH is an uplink symbol, then the UE does not receive PDSCH in that slot. Hence, in multi-TRP scheme 4, some of the transmission occasions may not be received by the UE in some slots if at least one of the scheduled symbols for PDSCH happens to be an uplink symbol. These transmission occasions that are not received by the UE are still counted as 'one reception' towards the indicated number of transmission occasions. This may limit the reliability of scheme 4 for certain TDD configurations.

In Rel-15, the maximum number of repetitions is 8. However, to ensure the reliability of scheme 4 for various TDD configuration, it is desirable to set the maximum number of repetitions to 16 in NR Rel-16.

Proposal 15 In NR Rel-16, the maximum number of repetitions for scheme 4 is 16.

In NR Rel-16 eURLLC, the following agreement is made for PUSCH:

Agreements:
For the dynamic indication of the number of repetitions for dynamic grant:
  Jointly coded with SLIV in TDRA table, by adding an additional column for the number of repetitions in the TDRA table
  The maximum TDRA table size is increased to 64
  No other spec impact is expected Similar to the above agreement, for scheme 4, we have agreed that the number of repetitions will be dynamically indicated by using the PDSCH-TimeDomainResourceAllocation field which also provides the SLIV. Hence, a similar level of scheduling flexibility is desired for PDSCH in the case of scheme 4. Thus, in the case of scheme 4, the maximum TDRA table size is 64.

Proposal 16 In NR Rel-16, the maximum TDRA table size given by 'maxNrofDL-Allocations' in TS38.331 is 64.

3.2.3 RV Sequence for Scheme 3

Different RV sequences may be beneficial for different scenarios. For example, (0,0) may be used in case there is a high probability that one TRP is blocked, while (0,2) may be used when blocking is a low probability. Up to 4 different RV sequences may be predefined and RV field of DCI can be used to select one of the sequences, similar to Rel-15. For Scheme 3 with only two repetitions, the same RV sequences in Table 1 for Scheme 2b may be used.

Proposal 17 Up to 4 RV sequences are predefined and the RV field in DCI is re-used to select one of the sequences for Schemes 3 and the same RV sequences as for Scheme 2b are used.

4 the Configuration of a Single TRP as a Special Case

For scheme 4, it has been agreed to dynamically
  For scheme 4, TDRA indication is enhanced to additionally indicate the number of PDSCH transmission occasions by using PDSCH-TimeDomainResourceAllocation field.

5 On Dynamic Switching Between Schemes

Talk about switching between URLLC-Single TRP-Multi-TRP-EMBB
In RAN1 #98b, the following agreement was reached:
Agreement
For single-DCI based M-TRP URLLC scheme differentiation among schemes 2a/2b/3, from the UE perspective:
A new RRC parameter is introduced to enable [one scheme/multiple schemes] among 2a/2b/3.
FFS on details
Note: dynamic switching between schemes (including fallback) is a separate discussion
If RRC is used to select one scheme among schemes 2a/2b/3, then there is no need for dynamic scheme selection principle among 2a/2b/3. If on the other hand, RRC is used to select either Scheme 2a/2b or Scheme 3, then dynamic selection between Schemes 2a and 2b would be needed.

From latency perspective, Schemes 2a/2b/3 are rather similar. For the same amount of resource utilization per OFDM symbol, Scheme 3 would provide more frequency diversity but double the DMRS overhead. In our view, Scheme 3 is mainly beneficial for FR2 while Schemes 2a/2b are mainly beneficial for FR1.

Therefore, having RRC configuration of either Schemes 2a/2b or Scheme 3 should be sufficient. Then, comparing Schemes 2a and 2b, it is noticed they are very similar in performance when the code rate is low such that systematic bits are transmitted from each TRP. At high code rate, Scheme 2a is slightly better when there is no deep fading or presence of channel blocking, otherwise, Scheme 2b is better. Given that Scheme 2b also needs additional UE capability signaling, RRC signaling is sufficient in practice. Thus, this leads us to the following proposal:

Proposal 18 Either of Scheme 2a, 2b or 3 is semi-statically enabled by RRC. No dynamic switching between these three different schemes is supported. Dynamic fallback to single TRP and/or single repetition is supported.

6 Remaining Issues for Multi-DCI Based Multi-TRP

6.1 Remaining Issues Related to RRC Signalling

From email discussion

6.2 Remaining Issues Related to PUCCH

From last meeting, we have this agreement with two options for down-selection in the Multi-TRP agenda:
Agreement
With regarding to PUCCH resource group for M-DCI NCJT transmission, select one of following options in RAN1 #98bis
Option 1: Support configuring explicit PUCCH resource grouping over resource or resource sets
Option 2: Support implicit PUCCH resource grouping up to NW implementation whereas PUCCH may or may not be overlapped.
Furthermore, in RAN1 #97, the following working assumption was reached in the Multi-Beam agenda:
Working Assumption
For the supported feature of simultaneous update/indication of a single spatial relation per group of PUCCH by using one MAC CE, the following configuration options for the group are supported:
At least up to two groups per BWP
FFS: Details on configuring the groups including whether to use implicit method or explicit method
For example, each corresponding to different TRP/panel, at least for multi-TRP/panel case
Another example, each corresponding to different active spatial relation at least for single TRP case
If there is no consensus to support more than two groups, only up to two groups will be supported in Rel-16

Currently, whether to introduce explicit PUCCH resource groups or not is being discussed in parallel in both the Multi-TRP and the Multi-Beam agendas. From our perspective, there may be a potential for conflicting agreements if such parallel discussions continue in RAN1 #98bis. Given that there is a working assumption in the Multi-Beam agenda, our preference is to discuss whether or not to introduce explicit PUCCH resource groups in the Multi-Beam agenda.

Observation 1 Whether to introduce explicit PUCCH resource groups or not is currently being discussed parallelly in both the Multi-TRP and the Multi-Beam agendas, and if such discussions continue, may result in conflicting agreements.

Proposal 19 Whether or not to introduce explicit PUCCH resource groups or not should be decided in the Multi-beam agenda.

There is a remaining FFS related PUCCH resource groups given below which was already supposed to be concluded in RAN1 #98
FFS whether/how to associate PUCCH resource groups and configured higher layer signaling indices of CORE-SETs (to be concluded in RAN1 98)

In the multi-DCI based multi-TRP case, a scheduler corresponding to each TRP will indicate to the UE which PUCCH resource to use for HARQ ACK/NACK feedback via the PUCCH resource indicator field in the scheduling DCI. Hence, the association between PUCCH resource group (if agreed) and configured higher layer signaling index in CORESET is already implicit, and we do not see the need to explicitly associate PUCCH resource groups and configured higher layer signaling indices of CORESET. In fact, we fail to see what benefit such explicit association would bring.

Proposal 20 In NR Rel-16, explicit association between PUCCH resource groups (if agreed in MB agenda) and higher layer signaling indices of CORESETs is not supported.

6.3 Remaining Issues Related to Dynamic HARQ-ACK Codebooks

From last meeting we have this agreement with two alternatives for down-selection for joint HARQ A/N feedback with multi-DCI:
Agreement
For joint dynamic HARQ-ACK codebook among M-TRP, select one from following alternatives in RAN1 #98bis
Alt 1: counter DAI is jointly counted across two TRPs (i.e. different higher layer index configured per CORESET (if configured)), and total DAI should count total number of DCIs in a PDCCH monitoring occasion across CCs and TRPs.
Alt 2: counter DAI is counted per TRP, and total DAI should count total number of DCIs in a PDCCH monitoring occasion across CCs for each TRP. HARQ-ACK information bits are then concatenated by the increasing order of TRPs (i.e. different higher layer index configured per CORESET (if configured)).

The use case of joint HARQ ACK feedback is, in our view, mainly for ideal backhaul with a single scheduler so that the HARQ A/N can be sent to a single TRP. Since the scheduling is done by a single scheduler, it makes sense to count the DCIs jointly across two TRPs for both counter DAI and total DAI. This would also ease UE processing as it only needs to deal with a single set of counters and minimal change is required from Rel-15 procedure. Therefore, Alt 1 is preferred.

Proposal 21 Alt 1 is supported for joint HARQ ACK codebook with multi-DCI.

For separate HARQ A/N feedback with multi-DCI based multi-TRP transmission, we have the following agreement from last RAN1 meeting:
Agreement
For multi-DCI based multi-TRP transmission with separate ACK/NACK feedback
  UE is allowed to transmit two TDMed long PUCCHs within a slot
  UE is allowed to transmit TDMed short PUCCH and long PUCCH within a slot
  UE is allowed to transmit TDMed short PUCCH and short PUCCH within a slot FFS whether/how to use PRI indication with the granularity of sub-slot for eMBB with M-TRP In our understanding, the sub-slot based PUCCH resource allocation discussed in eURLLC session is mainly related to the granularity of K1. When a UL sub-slot is indicated, the PUCCH resource indicator (PRI) field in DCI would point to a PUCCH resource within the sub-slot. Therefore, the FFS item is not an issue in our view. For sub-slot based PUCCH resource allocation and K1, we can reuse the mechanism that has been agreed in eURLLC.

6.4 Remaining Issues Related to PDSCH Rate Matching

From last meeting we have this agreement
Agreement
For multi-DCI based multi-TRP/panel transmission, the UE shall rate match around:
  Configured CRS patterns which optionally associated with a higher layer signaling index per CORESET (if configured) and are applied to the PDSCH scheduled with a DCI detected on a CORESET with the same higher layer index.
    This is a UE optional feature with separate UE capability signalling
    If UE does not support this feature, the default UE behaviour is the following:
      For multi-DCI based multi-TRP/panel transmission, the UE shall rate match PDSCH around configured CRS patterns from multiple TRPs
FFS: Whether/How to handle DMRS shifting if CRS patterns are configured.

To simplify the operation, if LTE CRS pattern is configured in any of the TRPs, the DMRS is shifted according to Rel.15 procedure for both TRPs. Hence Proposal 22 For multi-DCI based multi-TRP/panel transmission, if at least one LTE CRS patterns is configured, then PDSCH DM-RS is shifted according to Rel.15 procedure when DM-RS symbol collides with LTE CRS symbol and the shift is always applied for both received PDSCH.

6.4.1 Overlapping DMRS and PDSCH

For DMRS, different TCI states (i.e., TRPs) use different CDM groups. Hence, it is reasonable to also add the condition that PDSCH from one TRP is not simultaneously overlapping with DMRS transmitted from another TRP. Whether to map PDSCH to REs not used for DMRS is controlled by selecting the corresponding row in the antenna port indication table. Hence, we propose:

Proposal 23 A UE receiving downlink NC-JT scheduling assignments of two PDSCHs can ignore both scheduling assignments in case one of the scheduled PDSCH is mapped to REs used for DMRS to the other scheduled PDSCH to the same UE

6.5 Remaining Issues Related to DCI Format 1_0

In RAN1 #96, the following agreement was made:
Agreement
For a UE supporting multiple-PDCCH based multi-TRP/panel transmission and each PDCCH schedules one PDSCH, at least for eMBB with non-ideal backhaul, support following restrictions:
  The UE may be scheduled with fully/partially/non-overlapped PDSCHs at time and frequency domain by multiple PDCCHs with following restrictions:
  . . .
  The UE is not expected to have more than one TCI index with DMRS ports within the same CDM group for fully/partially overlapped PDSCHs
  . . .

In RAN1 #96, the following agreement was made:
Agreement
For a UE supporting multiple-PDCCH based multi-TRP/panel transmission and each PDCCH schedules one PDSCH, at least for eMBB with non-ideal backhaul, support following restrictions:
  The UE may be scheduled with fully/partially/non-overlapped PDSCHs at time and frequency domain by multiple PDCCHs with following restrictions:
  . . .
  The UE is not expected to have more than one TCI index with DMRS ports within the same CDM group for fully/partially overlapped PDSCHs
  . . .

The PDSCHs transmitted from different TRPs will have different TCI states associated with them. Therefore, according to the above agreement, the PDSCH DM-RSs from the different TRPs need to belong to different DM-RS CDM groups according to this restriction.

In the case when the PDSCHs are scheduled via DCI format 1-1, the Antenna ports field in the DCI indicates the PDSCH DMRS ports. Hence, in the case of DCI format 1-1, it can be easily ensured by proper indication of the PDSCH DMRS ports that the two PDSCH DM-RSs from the two TRPs belong to different DM-RS CDM groups.

However, the case when the PDSCHs are scheduled via DCI format 1-0 is problematic for multi-PDCCH based NC-JT as there is no Antenna ports field in DCI format 1-0. In the case of DCI format 1-0, the PDSCH DM-RS is assumed to use DM-RS port 0 which corresponds to CDM group 0. Hence, in the scenario when one or both TRPs are scheduling PDSCH using DCI format 1-0, then there is a strong possibility that both TRPs' PDSCH DMRS end up in CDM group 0. For Multi-PDCCH based NC-JT, this violates the restriction of having different TRPs' PDSCH DM-RS in different DM-RS CDM groups. Hence, a solution should be studied on how to ensure the above agreed restriction is satisfied when multi-PDCCH based NC-JT scheduling involves DCI format 1-0.

Observation 2 For Multi-PDCCH based NC-JT, scheduling PDSCH using DCI format 1_0 from one or both TRPs violates the restriction of having different TRPs' PDSCH DM-RS in different DM-RS CDM groups.

Hence, some solution to handle this issue should be discussed in RAN1.

6.6 Clarification on Number of TCI States Per DCI

For multi-DCI scheduling over two TRPs, the original motivation was that each TRP schedules its PDSCH independently. In that case, each DCI acts in the same way as in Rel-15. Therefore, only one TCI state is instated in each DCI. Also, multi-DCI operation is distinguished from single DCI when there are two higher layer indices configured for the CORESETs. So, we have the following proposal Proposal 24 Multi-DCI is enabled when two higher layer indices for the CORESETs are configured.

Proposal 25 When multi-DCI is enabled, only a single TCI state is indicated in each DCI.

Proposal 26 When multi-DCI is enabled and two PDSCHs are scheduled by two DCIs in a slot, the two PDSCHs are indicated with two different HARQ process IDs.

6.7 PDSCH Type Combinations Supported (which combinations should be supported: type A+type A, type B+type B, type A+type B)

6.8 Default TCI State

CONCLUSION

In the previous sections we made the following observations:

Observation 1 Whether to introduce explicit PUCCH resource groups or not is currently being discussed parallelly in both the Multi-TRP and the Multi-Beam agendas, and if such discussions continue, may result in conflicting agreements.

Observation 2 For Multi-PDCCH based NC-JT, scheduling PDSCH using DCI format 1_0 from one or both TRPs violates the restriction of having different TRPs' PDSCH DM-RS in different DM-RS CDM groups.

Based on the discussion in the previous sections we propose the following:

Proposal 1 For single PDCCH case, if two overlapping LTE CRS patterns are configured, the UE shall rate match PDSCH around both LTE CRS, for all received layers.

Proposal 2 When 2 TCI states are indicated in DCI and the K1 value in the same DCI is below the threshold, the default TCI states are the TCI states indicated in the DCI or TCIs associated to 2 CORESETs.

Proposal 3 If a TCI codepoint indicates two TCI states and indicated DMRS ports are from single CDM group, and if repetition scheme is not enabled (i.e. URLLC based scheme not enabled), then the UE applies the first TCI state and ignores the second TCI state in the codepoint.

Proposal 4 If a TCI codepoint indicates two TCI states and indicated DMRS ports are from three CDM groups, then the UE associates the first TCI state to the first CDM group ($\lambda=0$) and the second TCI states to the second and third CDM group ($\lambda=1, 2$).

Proposal 5 If a UE is scheduled with two codewords and two PTRS ports is configured for single-PDCCH based multi-TRP/Panel transmission at least for eMBB and URLLC scheme 1a, and if two TCI states are indicated by one TCI code point, and for each TCI state → if the TCI state is associated to two MCSs (i.e. the TCI state is associated with two code words) then the first PTRS port is associated with the lowest indexed DMRS port assigned for the codeword with the higher MCS within the DMRS ports corresponding to the TCI state, and → if the MCS indices of the two codewords are the same, then the first/second PTRS port is associated with the lowest indexed DMRS port within the DMRS ports corresponding to the first/second indicated TCI state Proposal 6 If a TCI codepoint indicates two TCI states and indicated DMRS ports are from single CDM group, and if two PT-RS ports are enabled, then a single PT-RS port is transmitted.

Proposal 7 In Scheme 2a and 2b, a single PT-RS port is used. If two PT-RS ports have been configured (in case dynamic switching between schemes is supported), then only the PT-RS port associated with the lowest index DM-RS port is transmitted.

Proposal 8 In scheme 2a, the UE shall not assume that it can use the PT-RS transmissions from PDSCH resources associated with different TCI states in a joint manner, when using PT-RS for tracking the phase. Hence, phase tracking needs to be estimated for each of the two groups of PDSCH resources separately.

Proposal 9 In scheme 2b, the PT-RS resource element mapping is established for each of the two PDSCHs independently (i.e. to the scheduled resources of the PDSCH). The UE shall not use PT-RS of one PDSCH as the PT-RS for the other PDSCH.

Proposal 10 In scheme 2b, the value used for the bandwidth NRB when determining KPT-RS from Table 5.1.6.3-2 in TS 38.214 is ceil(X/2) where X is the total number of scheduled resource blocks in the scheme 2b resource allocation.

Proposal 11 For Scheme 2b, use the 4 RV sequences listed in Table 1.

Proposal 12 With regards to restrictions on the possible value pairs for K and SLIV for Scheme 3, the following restrictions apply, and if the UE receives K and SLIV values in the scheduling DCI that do not satisfy the conditions below, then the UE can assume that only the first repetition in the slot is transmitted:

If using the starting symbol of the PDCCH monitoring occasion in which the DL assignment is detected as the reference point for starting symbol S is not enabled, then the restriction 0<2L≤14−S−K applies.

If using the starting symbol of the PDCCH monitoring occasion in which the DL assignment is detected as the reference point for starting symbol S is enabled, then the restriction 0<2L≤14−S−S0−K applies wherein S0 is the starting symbol of the PDCCH monitoring occasion in which the DL assignment is detected.

Proposal 13 Support a value range from 0 to 6 for the configurable symbol offset K.

Proposal 14 In NR Rel-16, the symbol offset K for multi-TRP scheme 3 is configured as part of PDSCH-TimeDomainResourceAllocation.

Proposal 15 In NR Rel-16, the maximum number of repetitions for scheme 4 is 16.

Proposal 16 In NR Rel-16, the maximum TDRA table size given by 'maxNrofDL-Allocations' in TS38.331 is 64.

Proposal 17 Up to 4 RV sequences are predefined and the RV field in DCI is re-used to select one of the sequences for Schemes 3 and the same RV sequences as for Scheme 2b are used.

Proposal 18 Either of Scheme 2a, 2b or 3 is semi-statically enabled by RRC. No dynamic switching between these three different schemes is supported. Dynamic fallback to single TRP and/or single repetition is supported.

Proposal 19 Whether or not to introduce explicit PUCCH resource groups or not should be decided in the Multi-beam agenda.

Proposal 20 In NR Rel-16, explicit association between PUCCH resource groups (if agreed in MB agenda) and higher layer signaling indices of CORESETs is not supported.

Proposal 21 Alt 1 is supported for joint HARQ ACK codebook with multi-DCI.

Proposal 22 For multi-DCI based multi-TRP/panel transmission, if at least one LTE CRS patterns is configured, then PDSCH DM-RS is shifted according to Rel.15 procedure when DM-RS symbol collides with LTE CRS symbol and the shift is always applied for both received PDSCH.

Proposal 23 A UE receiving downlink NC-JT scheduling assignments of two PDSCHs can ignore both scheduling assignments in case one of the scheduled PDSCH is mapped to REs used for DMRS to the other scheduled PDSCH to the same UE Proposal 24 Multi-DCI is enabled when two higher layer indices for the CORESETs are configured.

Proposal 25 When multi-DCI is enabled, only a single TCI state is indicated in each DCI.

Proposal 26 When multi-DCI is enabled and two PDSCHs are scheduled by two DCIs in a slot, the two PDSCHs are indicated with two different HARQ process IDs.

REFERENCES

[1] R1-1901702 "Further discussion on multi TRP transmission" vivo
[2] R1-1903043, "Multi-TRP Enhancements" Qualcomm Incorporated
[3] R1-1905166, "NC-JT performance with layer restriction between TRPs", Ericsson, 3GPP RAN1 #96bis.
[4] R1-1907423, "On MAC-CE signaling impact of Rel-16 TCI indication framework", Ericsson, 3GPP RAN1 #97
[5] R1-1907422, "Performance evaluation of NC-JT with different clustering approaches", Ericsson, RAN1 #97
[6] R1-1905165, "Performance comparison of different RV combinations for SDM and FDM based schemes", Ericsson, RAN1 #96bis
[7] R1-1907425, "Additional evaluation results on multi-TRP schemes for reliable PDSCH transmission in URLLC", Ericsson, RAN1 #97.
[8] R1-1907421, "On the number of TRPs for high reliability at 4 GHz", Ericsson, RAN1 #97.
[9] R1-1907420, "Additional evaluation results on NC-JT performance with layer restriction between TRPs", Ericsson, RAN1 #97.
[10] R1-1907515, "On schemes 3 and 4 for URLLC with Multi-TRP", Ericsson, RAN1 #97.
[11] R1-1907426, "On Multi-TRP based URLLC Schemes for Downlink SPS", Ericsson, RAN1 #97.
[12] RP-191599, "Enhancements for dynamic spectrum sharing in Rel-16", Ericsson, RAN #84
[13] R1-1909465, "On multi-TRP and multi-panel", Ericsson, RAN1 #98.
[14] R1-1909423, "Preliminary results on PDCCH over multi-TRP for URLLC", Ericsson, RAN1 #98.
[13] R2-1910143, "Protocol structure for Multi-TRP operation", Ericsson, RAN2 #107
[14] R1-1908066, "Enhancements on Multi-TRP/panel transmission", Huawei, HiSilicon

The invention claimed is:

1. A method for a UE in a multiple transmission points communication system, mTRP, the method comprising:
receiving a higher layer configuration of a mTRP scheme;
receiving downlink control information, DCI, indicating a first Transmission Configuration Indicator, TCI, state and a second TCI state in one Code Division Multiplexing, CDM, group for a scheduled data transmission on physical resource blocks, PRBs, wherein the PRBs comprise at least a first subset of PRBs, associated with the first TCI state, and a second subset of PRBs, associated with the second TCI state; and
determining a first Phase Tracking Reference Signal, PT-RS, frequency density for a PT-RS port in the first subset of PRBs based on a number of PRBs in the first subset of PRBs and a second PT-RS frequency density for the same PT-RS port in the second subset of PRBs based on a number of PRBs in the second subset of PRBs.

2. The method according to claim 1, wherein the first TCI state is associated with a first transmission point in the multiple transmission points communication system and wherein the second TCI state is associated with a second transmission point in the multiple transmission points communication system.

3. The method according to claim 1, wherein the PT-RS to resource element mapping is associated to allocated PRBs for each TCI state.

4. The method according to claim 1, wherein the scheduled data transmission comprises one or more physical downlink shared channel, PDSCH, transmissions scheduled by the DCI.

5. The method according to claim 1, wherein the first PT-RS frequency density and the second PT-RS frequency density are determined for the same PT-RS port.

6. The method according to claim 5, wherein the mTRP scheme is one of a frequency division multiplexing, FDM, Scheme 2a, wherein a single PDSCH transmission for a transport block, TB, is scheduled across the first subset of PRBs and the second subset of PRBs, or a FDM Scheme 2b, wherein a first PDSCH transmission for a TB is scheduled in the first subset of PRBs and a second PDSCH transmission for the same TB is scheduled in the second subset of PRBs.

7. The method according to claim 1 wherein the at least the first subset of PRBs and the second subset of PRBs are non-overlapping.

8. A user equipment, UE, operable in a multiple transmission points communication system, mTRP, the UE comprising a transceiver and processing circuitry configured to:
receive a higher layer configuration of a mTRP scheme;
receive downlink control information, DCI, indicating a first Transmission Configuration Indicator, TCI, state and a second TCI state in one Code Division Multiplexing, CDM, group for a scheduled data transmission on physical resource blocks, PRBs, wherein the PRBs comprise at least a first subset of PRBs, associated with the first TCI state, and a second subset of PRBs, associated with the second TCI state; and
determine a first Phase Tracking Reference Signal, PT-RS, frequency density for a PT-RS port in the first subset of PRBs based on a number of PRBs in the first subset of PRBs and a second PT-RS frequency density for the same PT-RS port in the second subset of PRBs based on a number of PRBs in the second subset of PRBs.

9. The UE according to claim 8, wherein the first TCI state is associated with a first transmission point in the multiple transmission points communication system and wherein the second TCI state is associated with a second transmission point the multiple transmission points communication system.

10. The UE according to claim 8, wherein the PT-RS to resource element mapping is associated to allocated PRBs for each TCI state.

11. The UE according to claim 8, wherein the scheduled data transmission comprises one or more physical downlink shared channel, PDSCH, transmissions scheduled by the DCI.

12. The UE according to claim 8, wherein the first PT-RS frequency density and the second PT-RS frequency density are determined for the same PT-RS port.

13. The UE according to claim 12, wherein the mTRP scheme is one of a frequency division multiplexing, FDM, Scheme 2a, wherein a single PDSCH transmission for a transport block, TB, is scheduled across the first subset of PRBs and the second subset of PRBs, or a FDM Scheme 2b, wherein a first PDSCH transmission for a TB is scheduled in the first subset of PRBs and a second PDSCH transmission for the same TB is scheduled in the second subset of PRBs.

14. The UE according to claim 8, wherein the at least the first subset of PRBs and the second subset of PRBs are non-overlapping.

15. A method for a base station in a multiple transmission points communication system, mTRP, scheme, the method comprising:
transmitting a higher layer configuration of a mTRP scheme;
transmitting downlink control information, DCI, indicating a first Transmission Configuration Indicator, TCI, state and a second TCI state in one Code Division Multiplexing, CDM, group for a scheduled data transmission on physical resource blocks, PRBs, wherein the PRBs comprise at least a first subset of PRBs, associated with the first TCI state, and a second subset of PRBs, associated with the second TCI state; and
wherein a first Phase Tracking Reference Signal, PT-RS, frequency density for a PT-RS port for the first subset of PRBs is obtainable based on a number of PRBs in the first subset of PRBs and a second PT-RS frequency density for the same PT-RS port in the second subset of PRBs is obtainable based on a number of PRBs in the second subset of PRBs.

16. The method according to claim 15, wherein the first TCI state is associated with a first transmission point in the multiple transmission points communication system and wherein the second TCI state is associated with a second transmission point in the multiple transmission points communication system.

17. The method according to claim 15, wherein the PT-RS to resource element mapping is associated to allocated PRBs for each TCI state.

18. The method according to claim 15, wherein the scheduled data transmission comprises one or more physical downlink shared channel, PDSCH, transmissions scheduled by the DCI.

19. The method according to claim 15, wherein the first PT-RS frequency density and the second PT-RS frequency density are determined for the same PT-RS port.

20. The method according to claim 19, wherein the mTRP scheme is one of a frequency division multiplexing, FDM, Scheme 2a, wherein a single PDSCH transmission for a transport block, TB, is scheduled across the first subset of PRBS and the second subset of PRBs, or a FDM Scheme 2b, wherein a first PDSCH transmission for a TB is scheduled in the first subset of PRBs and a second PDSCH transmission for the same TB is scheduled in the second subset of PRBs.

21. The method according to claim 15 wherein the at least the first subset of PRBs and the second subset of PRBs are non-overlapping.

22. A base station operable in a multiple transmission points communication system, mTRP, scheme, the base station comprising a transceiver and processing circuitry and configured to:
transmit a higher layer configuration of a mTRP scheme;
transmit downlink control information, DCI, indicating a first Transmission Configuration Indicator, TCI, state and a second TCI state in one Code Division Multiplexing, CDM, group for a scheduled data transmission on physical resource blocks, PRBs, wherein the PRBs comprise at least a first subset of PRBs, associated with the first TCI state, and a second subset of PRBs, associated with the second TCI state; and
wherein a first Phase Tracking Reference Signal, PT-RS, frequency density for a PT-RS port in the first subset of PRBs is obtainable based on a number of PRBs in the first subset of PRBs and a second PT-RS frequency density for the same PT-RS port in the second subset of PRBs is obtainable based on a number of PRBs in the second subset of PRBs.

23. The base station according to claim 22, wherein the first TCI state is associated with a first transmission point in the multiple transmission points communication system and wherein the second TCI state is associated with a second transmission point in the multiple transmission points communication system.

24. The base station according to claim 22, wherein the PT-RS to resource element mapping is associated to allocated PRBs for each TCI state.

25. The base station according to claim 22, wherein the scheduled data transmission comprises one or more physical downlink shared channel, PDSCH, transmissions scheduled by the DCI.

26. The base station according to claim 22, wherein the first PT-RS frequency density and the second PT-RS frequency density are determined for the same PT-RS port.

27. The base station according to claim 26, wherein the mTRP scheme is one of a FDM Scheme 2a, wherein a single PDSCH transmission for a transport block, TB, is scheduled across the first subset of PRBS and the second subset of PRBs, or a FDM Scheme 2b, wherein a first PDSCH transmission for a TB is scheduled in the first subset of PRBs and a second PDSCH transmission for the same TB is scheduled in the second subset of PRBs.

28. The base station according to claim 22 wherein the at least the first subset of PRBs and the second subset of PRBs are non-overlapping.

* * * * *

UNITED STATES PATENT AND TRADEMARK OFFICE
CERTIFICATE OF CORRECTION

| | |
|---|---|
| PATENT NO. | : 11,757,594 B2 |
| APPLICATION NO. | : 17/405263 |
| DATED | : September 12, 2023 |
| INVENTOR(S) | : Frenne et al. |

Page 1 of 5

It is certified that error appears in the above-identified patent and that said Letters Patent is hereby corrected as shown below:

On the Title Page

In Item (56), under "FOREIGN PATENT DOCUMENTS", in Column 2, Line 1, delete "1030760 A1" and insert -- 4030670 A1 --, therefor.

In Item (57), under "ABSTRACT", in Column 2, Line 4, delete "a at" and insert -- an at --, therefor.

On Page 2, In Item (56), under "OTHER PUBLICATIONS", in Column 2, Line 48, delete "Meeeting" and insert -- Meeting --, therefor.

In the Drawings

In Figure 15, Sheet 10 of 22, and on the title page, the illustrative print figure, for Step "1503", in Line 1, delete "A" and insert -- AN --, therefor.

Figure 16:
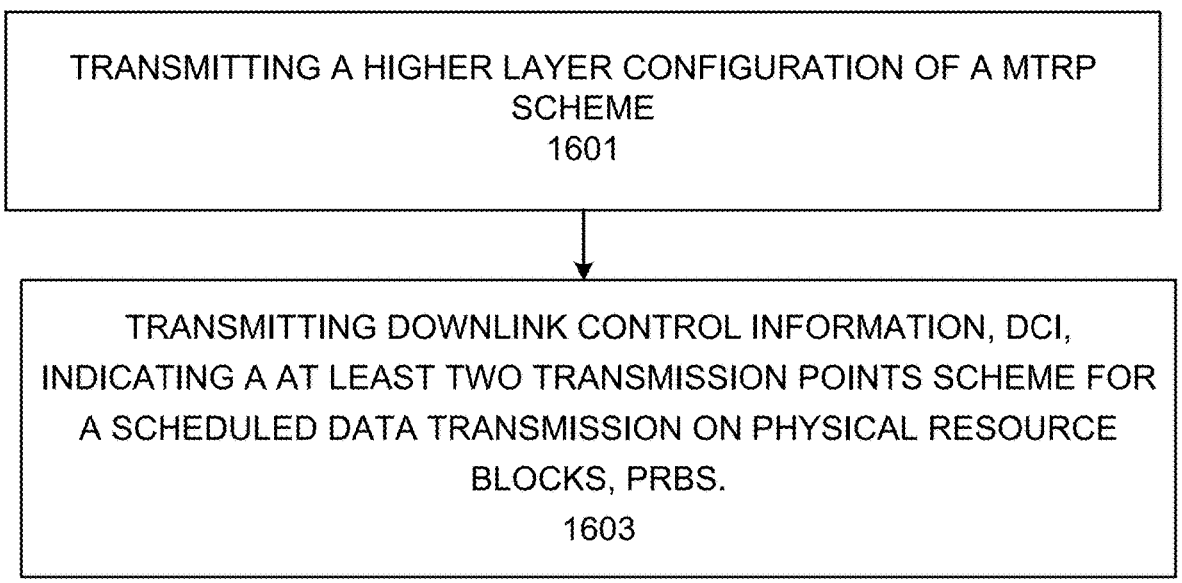
FIG. 16 is a flow chart illustrating operations of a RAN node according to some embodiments of inventive concepts.

In Figure 16, Sheet 11 of 22, for Step "1603", in Line 2, delete "A" and insert -- AN --, therefor.

In Figure 21, Sheet 16 of 22, for Tag "4172", in Line 1, delete "TRANCEIVER" and insert -- TRANSCEIVER --, therefor.

In Figure 21, Sheet 16 of 22, for Tag "4174", in Line 1, delete "BASEBAND" and insert -- BASEBAND PROCESSING --, therefor.

In Figure 21, Sheet 16 of 22, for Tag "4122", in Line 2, delete "TRANCEIVER" and insert -- TRANSCEIVER --, therefor.

In Figure 21, Sheet 16 of 22, for Tag "4124", in Line 1, delete "BASEBAND" and insert -- BASEBAND PROCESSING --, therefor.

Signed and Sealed this
Twenty-third Day of January, 2024

Katherine Kelly Vidal
*Director of the United States Patent and Trademark Office*

CERTIFICATE OF CORRECTION (continued)
U.S. Pat. No. 11,757,594 B2

In the Specification

In Column 1, Line 9, delete "2020," and insert -- 2020, now Pat. No. 11,128,428, --, therefor.

In Column 1, Line 30, delete "station," and insert -- station) --, therefor.

In Column 1, Line 40, delete "irrespectively" and insert -- irrespective --, therefor.

In Column 2, Line 3, delete "successfully," and insert -- successful, --, therefor.

In Column 3, Line 25, delete "($K_{PT,RS}$)" and insert -- ($K_{PT-RS}$) --, therefor.

In Column 8, Line 67, delete "allocation" and insert -- allocation. --, therefor.

In Column 9, Line 19, delete "knows" and insert -- known --, therefor.

In Column 10, Line 24, delete "TRP2" and insert -- TRP2. --, therefor.

In Column 10, Line 66, delete "NRBO and NRB1" and insert -- NRB0 and NRB1 --, therefor.

In Column 12, Line 7, delete "a" and insert -- α --, therefor.

In Column 12, Line 13, delete "($K_{PT,RS}$)" and insert -- ($K_{PT-RS}$) --, therefor.

In Column 13, Line 1, delete "use" and insert -- using --, therefor.

In Column 13, in Table 2, Line 3, delete "($K_{PT,RS}$ )" and insert -- ($K_{PT-RS}$) --, therefor.

In Column 13, Line 49, delete "a at" and insert -- an at --, therefor.

In Column 13, Line 54, delete "Through-out" and insert -- Throughout --, therefor.

In Column 14, Line 38, delete "a at" and insert -- an at --, therefor.

In Column 14, Line 43, delete "Through-out" and insert -- Throughout --, therefor.

In Column 16, Line 15, delete "a" and insert -- whether a --, therefor.

In Column 16, Line 29, delete "block" and insert -- block. --, therefor.

In Column 16, Line 32, delete "responsive" and insert -- be responsive --, therefor.

In Column 18, Line 30, delete "2b" and insert -- 2b. --, therefor.

In Column 20, Lines 16-17, delete "network node, RAN," and insert -- network, RAN, node --, therefor.

CERTIFICATE OF CORRECTION (continued)
U.S. Pat. No. 11,757,594 B2

In Column 22, Line 13, delete "data" and insert -- shared --, therefor.

In Column 22, Line 14, delete "data" and insert -- shared --, therefor.

In Column 24, Line 45, delete "NodeB's." and insert -- NodeBs. --, therefor.

In Column 25, Line 20, delete "(SOC)" and insert -- (SoC). --, therefor.

In Column 25, Line 30, delete "units" and insert -- units. --, therefor.

In Column 25, Line 40, delete "manner In" and insert -- manner. In --, therefor.

In Column 26, Lines 43-44, delete "radio front end circuitry 4190" and insert -- radio front end circuitry 4192 --, therefor.

In Column 27, Line 59, delete "(CPE). a" and insert -- (CPE), a --, therefor.

In Column 28, Line 48, delete "radio front end circuitry 4114" and insert -- radio front end circuitry 4112 --, therefor.

In Column 29, Line 24, delete "SOC." and insert -- SoC. --, therefor.

In Column 29, Line 51, delete "manner In" and insert -- manner. In --, therefor.

In Column 31, Line 27, delete "UE 42200" and insert -- UE 4200 --, therefor.

In Column 31, Line 36, delete "interchangeable." and insert -- interchangeably. --, therefor.

In Column 31, Line 45, delete "power source 4233," and insert -- transmitter 4233, --, therefor.

In Column 33, Line 16, delete "(SIM/RUIM) module," and insert -- module (SIM/RUIM), --, therefor.

In Column 34, Line 51, delete "memory 4390. Memory 4390" and insert -- memory 4390-1. Memory 4390-1 --, therefor.

In Column 38, Line 13, delete "which it" and insert -- which --, therefor.

In Column 38, Line 49, delete "etc.; the" and insert -- etc. The --, therefor.

In Column 38, Line 62, delete "embodiments" and insert -- embodiments. --, therefor.

In Column 39, Line 34, delete "embodiments" and insert -- embodiments. --, therefor.

In Column 39, Line 53, delete "substep 4830" and insert -- step 4830 --, therefor.

In Column 39, Line 60, delete "embodiments" and insert -- embodiments. --, therefor.

CERTIFICATE OF CORRECTION (continued)

In Column 40, Line 28, delete "according" and insert -- according to --, therefor.

In Column 41, Line 17, delete "PPS" and insert -- FFS --, therefor.

In Column 41, Line 52, delete "Profile" and insert -- Power --, therefor.

In Column 41, Line 54, delete "Packet" and insert -- Packet Data Network --, therefor.

In Column 41, Line 57, delete "Precoder" and insert -- Precoding --, therefor.

In Column 41, Line 67, delete "Management" and insert -- Monitoring --, therefor.

In Column 42, Line 36, delete "Wide" and insert -- Wideband --, therefor.

In Column 42, Line 37, delete "Wide" and insert -- Wireless --, therefor.

In Column 43, Line 1, delete "and" and insert -- or --, therefor.

In Column 47, Line 25, delete "sequences)" and insert -- sequences). --, therefor.

In Column 47, Line 32, delete "at a" and insert -- a --, therefor.

In Column 48, Line 11, delete "#99" and insert -- #99. --, therefor.

In Column 48, Line 13, delete "SLIV" and insert -- SLIV. --, therefor.

In Column 48, Line 41, delete "K0=0" and insert -- $K_0=0$ --, therefor.

In Column 48, Line 42, delete "K0>0" and insert -- $K_0>0$ --, therefor.

In Column 49, Line 41, delete "allow" and insert -- be allowed --, therefor.

In Column 53, Line 24, delete "M-TRP" and insert -- M-TRP. --, therefor.

In Column 53, Line 40, delete "which" and insert -- which are --, therefor.

In Column 53, Line 51, delete "TRPs" and insert -- TRPs. --, therefor.

In Column 54, Line 10, delete "UE" and insert -- UE. --, therefor.

In Column 56, Line 11, delete "state" and insert -- state. --, therefor.

In Column 56, Line 33, delete "NRB" and insert -- $N_{RB}$ --, therefor.

In Column 56, Line 33, delete "KPT-RS" and insert -- $K_{PT-RS}$ --, therefor.

CERTIFICATE OF CORRECTION (continued)
U.S. Pat. No. 11,757,594 B2

In Column 56, Line 52, delete "0<2L≤14-S-S0-K applies wherein S0" and insert -- 0<2L≤14-S-$S_0$-K applies wherein $S_0$ --, therefor.

In Column 57, Line 24, delete "UE" and insert -- UE. --, therefor.

In Column 57, Line 36, delete "vivo" and insert -- vivo. --, therefor.

In Column 57, Line 38, delete "Incorporated" and insert -- Incorporated. --, therefor.

In Column 57, Line 42, delete "RAN1 #97" and insert -- RAN1 #97. --, therefor.

In Column 57, Line 44, delete "RAN1 #97" and insert -- RAN1 #97. --, therefor.

In Column 57, Line 47, delete "RAN1 #96bis" and insert -- RAN1 #96bis. --, therefor.

In Column 57, Line 61, delete "RAN #84" and insert -- RAN #84. --, therefor.

In Column 57, Line 67, delete "RAN2 #107" and insert -- RAN2 #107. --, therefor.

In Column 58, Line 2, delete "HiSilicon" and insert -- HiSilicon. --, therefor.

In the Claims

In Column 59, Line 8, in Claim 9, delete "the" and insert -- in the --, therefor.

In Column 60, Line 8, in Claim 20, delete "PRBS" and insert -- PRBs --, therefor.

In Column 60, Line 13, in Claim 21, delete "claim 15" and insert -- claim 15, --, therefor.

In Column 60, Line 55, in Claim 27, delete "PRBS" and insert -- PRBs --, therefor.

In Column 60, Line 60, in Claim 28, delete "claim 22" and insert -- claim 22, --, therefor.